US011667151B2

(12) United States Patent
Ferguson et al.

(10) Patent No.: US 11,667,151 B2
(45) Date of Patent: Jun. 6, 2023

(54) WHEEL COVER

(71) Applicant: Consolidated Metco, Inc., Vancouver, WA (US)

(72) Inventors: Matthew J. Ferguson, Portland, OR (US); Stephen Green, Vancouver, WA (US); Charles Becker, Portland, OR (US)

(73) Assignee: Consolidated Metco, Inc., Vancouver, WA (US)

( * ) Notice: Subject to any disclaimer, the term of this patent is extended or adjusted under 35 U.S.C. 154(b) by 623 days.

(21) Appl. No.: 16/800,335

(22) Filed: Feb. 25, 2020

(65) Prior Publication Data
US 2020/0276860 A1 Sep. 3, 2020

Related U.S. Application Data

(60) Provisional application No. 62/812,737, filed on Mar. 1, 2019.

(51) Int. Cl.
*B60B 7/08* (2006.01)
*B60B 7/04* (2006.01)
*B60B 7/06* (2006.01)

(52) U.S. Cl.
CPC ............... *B60B 7/08* (2013.01); *B60B 7/04* (2013.01); *B60B 7/066* (2013.01); *B60B 2320/10* (2013.01)

(58) Field of Classification Search
CPC .............. B60B 7/08; B60B 7/04; B60B 7/066
See application file for complete search history.

(56) References Cited

U.S. PATENT DOCUMENTS

| 1,722,783 A | 7/1929 | Basseches |
| 1,871,144 A | 8/1932 | Wilczynski |

(Continued)

FOREIGN PATENT DOCUMENTS

| EP | 0200812 | 11/1986 |
| EP | 0300538 | 1/1989 |

(Continued)

OTHER PUBLICATIONS

International Search Report and Written Opinion from International Patent Application No. PCT/US2020/019793 dated Jul. 8, 2020; 14 pages.

(Continued)

*Primary Examiner* — Scott A Browne
(74) *Attorney, Agent, or Firm* — Fitch, Even, Tabin & Flannery LLP

(57) ABSTRACT

In one embodiment, a vehicle wheel cover assembly is provided that includes a mount having an attachment portion with a release configuration that permits the attachment portion to engage inboard and outboard surfaces of a wheel hub flange of a wheel and a secured configuration that fixes the attachment portion to the wheel hub flange. The wheel cover assembly includes a retainer shiftable relative to the attachment portion of the mount from an unlocked position wherein the retainer permits the attachment portion to be reconfigured between the release configuration and the secured configured configuration to a locked position wherein the retainer maintains the attachment portion in the secured configuration. The wheel cover assembly further includes a cover assembly configured to be releasably secured to the mount to cover an opening of the wheel.

34 Claims, 18 Drawing Sheets

(56) References Cited

U.S. PATENT DOCUMENTS

| | | |
|---|---|---|
| 1,875,906 A | 9/1932 | Zarobsky |
| 2,031,355 A | 2/1936 | Zerk |
| 2,043,874 A | 6/1936 | Zerk |
| 2,108,145 A | 2/1938 | Short |
| 2,109,684 A | 3/1938 | Short |
| 2,432,531 A | 12/1947 | Lyon |
| 2,440,805 A | 5/1948 | Lyon |
| 2,526,026 A | 10/1950 | Horn |
| 2,567,142 A | 9/1951 | Barker |
| 2,639,948 A | 5/1953 | Grimshaw |
| 2,650,135 A | 8/1953 | Lyon |
| 2,726,900 A | 12/1955 | Stanetzki |
| 2,794,684 A | 6/1957 | Lyon |
| 2,869,929 A | 1/1959 | Hurd |
| 3,078,124 A | 2/1963 | Mulder |
| 3,092,420 A | 6/1963 | Baldwin |
| 3,317,247 A | 5/1967 | Lamme |
| 3,352,133 A | 11/1967 | Selleck |
| 3,356,421 A | 12/1967 | Trevarrow, Jr. |
| 3,367,722 A | 2/1968 | Miyanaga |
| 3,371,832 A | 3/1968 | Sekino |
| 3,515,196 A | 6/1970 | Floria |
| 3,532,384 A | 10/1970 | Williams, Jr. |
| 3,585,824 A | 6/1971 | Schenk |
| 3,724,905 A | 4/1973 | Kachler |
| 3,860,297 A | 1/1975 | Solis |
| 3,918,764 A | 11/1975 | Lamme |
| 3,939,894 A | 2/1976 | Curtis |
| 3,988,039 A | 10/1976 | Spisak |
| 4,040,672 A | 8/1977 | Imahashi |
| 4,043,685 A | 8/1977 | Hyams |
| 4,064,923 A | 12/1977 | German |
| 4,067,621 A | 1/1978 | Reppert |
| 4,229,047 A | 10/1980 | Beisch |
| 4,261,621 A | 4/1981 | Fox |
| 4,333,688 A | 6/1982 | Lemmon |
| 4,593,953 A | 6/1986 | Baba |
| 4,635,335 A | 1/1987 | Brown |
| 4,725,100 A | 2/1988 | Patti |
| 4,730,952 A | 3/1988 | Wiley |
| 4,761,040 A | 8/1988 | Johnson |
| RE32,903 E | 4/1989 | Braungart |
| 4,834,464 A | 5/1989 | Frehse |
| 4,842,339 A | 6/1989 | Roulinson |
| 4,889,394 A | 12/1989 | Ruspa |
| 4,895,415 A | 1/1990 | Stay |
| 4,971,396 A | 11/1990 | Morris |
| 4,974,909 A | 12/1990 | Patti |
| 4,984,851 A | 1/1991 | Hayano |
| 4,995,673 A | 2/1991 | Dubost |
| 5,021,918 A | 6/1991 | Maki |
| 5,042,881 A | 8/1991 | Polka |
| 5,046,784 A | 9/1991 | Carter, III |
| 5,061,014 A | 10/1991 | Polka |
| 5,135,289 A | 8/1992 | Fleck |
| 5,152,584 A | 10/1992 | Maxwell, Jr. |
| 5,167,440 A | 12/1992 | Fitzgerald |
| 5,222,785 A | 6/1993 | Green |
| 5,234,260 A | 8/1993 | Coombes, Jr. |
| 5,263,770 A | 11/1993 | Goudey |
| 5,291,130 A | 3/1994 | Kendzior |
| 5,294,189 A | 3/1994 | Price |
| 5,358,313 A | 10/1994 | Polka |
| 5,366,278 A | 11/1994 | Brumfield |
| 5,366,279 A | 11/1994 | Polka |
| 5,443,582 A | 8/1995 | Ching |
| 5,482,358 A | 1/1996 | Kuck |
| 5,542,750 A | 8/1996 | Fitzgerald |
| RE35,497 E | 4/1997 | Carter, III |
| 5,630,653 A | 5/1997 | Polka |
| 5,770,797 A | 6/1998 | Lapohn |
| 5,785,390 A | 7/1998 | Gold |
| 5,795,035 A | 8/1998 | Fuller |
| 5,823,635 A | 10/1998 | Polka |
| 5,860,708 A | 1/1999 | Borders |
| 5,871,335 A | 2/1999 | Bartlett |
| 5,876,099 A | 3/1999 | Irgens-Moller |
| 6,045,195 A | 4/2000 | Okamoto |
| 6,105,645 A | 8/2000 | Ingram |
| 6,120,104 A | 9/2000 | Okamoto |
| 6,152,537 A | 11/2000 | Wright |
| 6,189,977 B1 | 2/2001 | Kennedy |
| 6,325,124 B1 | 12/2001 | Colussi |
| 6,378,954 B1 | 4/2002 | Polka |
| 6,378,955 B1 | 4/2002 | Adamson |
| 6,386,642 B2 | 5/2002 | Maloney |
| 6,409,277 B2 | 6/2002 | Nunes |
| 6,419,326 B1 | 7/2002 | Rains |
| 6,443,528 B1 | 9/2002 | Polka |
| 6,467,852 B1 | 10/2002 | Polka |
| 6,517,167 B2 | 2/2003 | Baker |
| 6,575,537 B1 | 6/2003 | Wang |
| 6,595,596 B1 | 7/2003 | Polka |
| 6,663,188 B2 | 12/2003 | Sumi |
| 6,682,151 B1 | 1/2004 | Van Houten |
| 6,705,369 B1 | 3/2004 | Russell |
| 6,783,191 B1 | 8/2004 | Slesinski |
| 6,820,475 B2 | 11/2004 | Wallach |
| 6,857,708 B2 | 2/2005 | Hartl |
| 6,857,709 B1 | 2/2005 | McLean |
| 6,860,568 B2 | 3/2005 | Nunes |
| 6,932,434 B2 | 8/2005 | Wang |
| 6,945,609 B2 | 9/2005 | Barney |
| 6,983,998 B2 | 1/2006 | Litzka |
| 7,059,684 B1 | 6/2006 | Polka |
| 7,081,081 B2 | 7/2006 | Schutz |
| 7,131,705 B1 | 11/2006 | Delvecchio |
| 7,156,890 B1 | 1/2007 | Thompson |
| 7,218,210 B2 | 5/2007 | Schoenberger |
| 7,344,198 B1 | 3/2008 | Dohm |
| 7,416,259 B2 | 8/2008 | Dagh |
| 7,416,260 B1 | 8/2008 | Cuevas |
| 7,484,736 B2 | 2/2009 | Allemann |
| 7,530,643 B1 | 5/2009 | Walker |
| 7,547,076 B2 | 6/2009 | Necaise |
| 7,661,766 B2 | 2/2010 | Davis |
| 7,677,677 B1 | 3/2010 | Roberts |
| 7,775,604 B2 | 8/2010 | Chen |
| 8,011,848 B2 | 9/2011 | Sockman |
| 8,276,992 B2 | 10/2012 | Smith |
| 8,382,210 B1 | 2/2013 | Fleck |
| 8,454,213 B2 | 6/2013 | Lin |
| 8,727,452 B2 | 5/2014 | Merten |
| 8,801,107 B2 | 8/2014 | Schmid |
| 8,857,921 B2 | 10/2014 | Schmid |
| 9,114,874 B1 | 8/2015 | Danto |
| 9,199,508 B2 | 12/2015 | Kronemeyer |
| 9,290,044 B2 | 3/2016 | Leung |
| 9,302,536 B2 | 4/2016 | Wildey |
| 9,308,776 B2 | 4/2016 | Templin |
| 9,321,302 B2 | 4/2016 | Fleck |
| 9,321,304 B2 | 4/2016 | Wildey |
| 9,327,550 B2 | 5/2016 | Butler |
| 9,365,074 B2 | 6/2016 | Polka |
| 9,421,819 B2 | 8/2016 | Yu |
| 9,561,687 B2 | 2/2017 | Polka |
| 9,821,598 B2 | 11/2017 | Fleck |
| 9,975,375 B2 | 5/2018 | Wildey |
| 10,343,450 B2 | 7/2019 | Butler |
| 10,703,132 B2 | 7/2020 | Wren |
| 10,919,337 B2 | 2/2021 | Wren |
| 2003/0038529 A1 | 2/2003 | Hsu |
| 2003/0047987 A1 | 3/2003 | Enomoto |
| 2004/0075335 A1 | 4/2004 | Hartl |
| 2005/0040696 A1 | 2/2005 | Chiu |
| 2005/0146204 A1 | 7/2005 | Kim |
| 2005/0199328 A1 | 9/2005 | Schoenberger |
| 2006/0192422 A1 | 8/2006 | Goodman |
| 2009/0224597 A1 | 9/2009 | Wood |
| 2010/0270853 A1 | 10/2010 | Smith |
| 2011/0089748 A1 | 4/2011 | Grill |
| 2011/0101767 A1 | 5/2011 | Fleck |
| 2011/0116279 A1 | 5/2011 | Lin |
| 2012/0043803 A1 | 2/2012 | Grill |

(56) References Cited

U.S. PATENT DOCUMENTS

| | | |
|---|---|---|
| 2012/0181849 A1 | 7/2012 | Rogers |
| 2012/0256473 A1 | 10/2012 | Schmid |
| 2012/0314980 A1 | 12/2012 | Chen |
| 2013/0015698 A1 | 1/2013 | Butler |
| 2013/0069422 A1 | 3/2013 | Li |
| 2013/0076107 A1 | 3/2013 | Starnes |
| 2013/0207447 A1 | 8/2013 | De Lima |
| 2013/0313889 A1 | 11/2013 | Schmid |
| 2013/0334869 A1 | 12/2013 | Kronemeyer |
| 2014/0152079 A1 | 6/2014 | Vickers |
| 2014/0159469 A1 | 6/2014 | Chinavare |
| 2014/0265533 A1 | 9/2014 | Polka |
| 2014/0284994 A1 | 9/2014 | Polka |
| 2014/0346844 A1 | 11/2014 | Wildey |
| 2015/0210110 A1 | 7/2015 | Rose |
| 2016/0016429 A1 | 1/2016 | Wildey |
| 2017/0157979 A1 | 6/2017 | Polka |
| 2017/0282642 A1 | 10/2017 | Wang |
| 2017/0341463 A1 | 11/2017 | Takeda |
| 2019/0092089 A1 | 3/2019 | Wren |
| 2019/0270335 A1 | 9/2019 | Butler |

FOREIGN PATENT DOCUMENTS

| | | |
|---|---|---|
| EP | 1724124 A1 | 11/2006 |
| GB | 2291017 A | 1/1996 |
| WO | 2008100338 | 8/2008 |
| WO | 2018136529 | 7/2018 |

OTHER PUBLICATIONS

Invitation to Pay Additional Fees from International Patent Application No. PCT/US2020/019793 dated May 7, 2020; 2 pages.

AeroTech Caps Installation Video, https://www.youtube.com/watch?v=wHtH1yfsRXc, posted Feb. 10, 2014, 8 pages.

Deflecktor aerodynamic wheel cover 2017, https://www.youtube.com/watch?v=ESQFIBIocTY&t=34s, posted Oct. 17, 2017, of Deflektor aerodynamic wheel cover believed to be publicly available before Sep. 22, 2017, 7 pages.

FlowBelow Aero Inc., Tractor AeroKit product guide printed from Wayback Machine https://web.archive.org/web/20170902023134/https://www.flowbelow.com/aerokit dated Sep. 2, 2017; 6 pages.

RealWheels Corporation, Twist & Lock™ Aero Covers product guide printed from Wayback Machine https://web.archive.org/web/20170209214634/https://www.realwheels.com/product/twist-lock-aero-covers/ dated Feb. 9, 2017; 7 pages.

Consolidated Metco, flyer, Wheelshield, publicly available Sep. 25, 2017, 1 page.

WHEEL COVER

CROSS-REFERENCE TO RELATED APPLICATION

This application claims the benefit of U.S. Provisional Application No. 62/812,737, filed Mar. 1, 2019, which is hereby incorporated herein by reference in its entirety.

FIELD

This disclosure relates to a commercial vehicle wheel cover and, more specifically, to a wheel cover with an attachment system that permits ready installation and removal of the wheel cover.

BACKGROUND

Commercial vehicles, such as trucks, trailers, and busses, often utilize wheel covers to provide a more aerodynamic shape of a wheel of the vehicle by filling a void or an indentation formed by the rim of the wheel. Some prior wheel covers are difficult and time-consuming to install. These prior wheel covers may require specialized tools to mount the wheel cover to the hub of the wheel. After installation, an operator may have to completely uninstall the prior wheel covers to comply with pre-trip inspection laws that require an operator to inspect the wheels of the vehicle prior to every trip.

DETAILED DESCRIPTION

Figure 1:
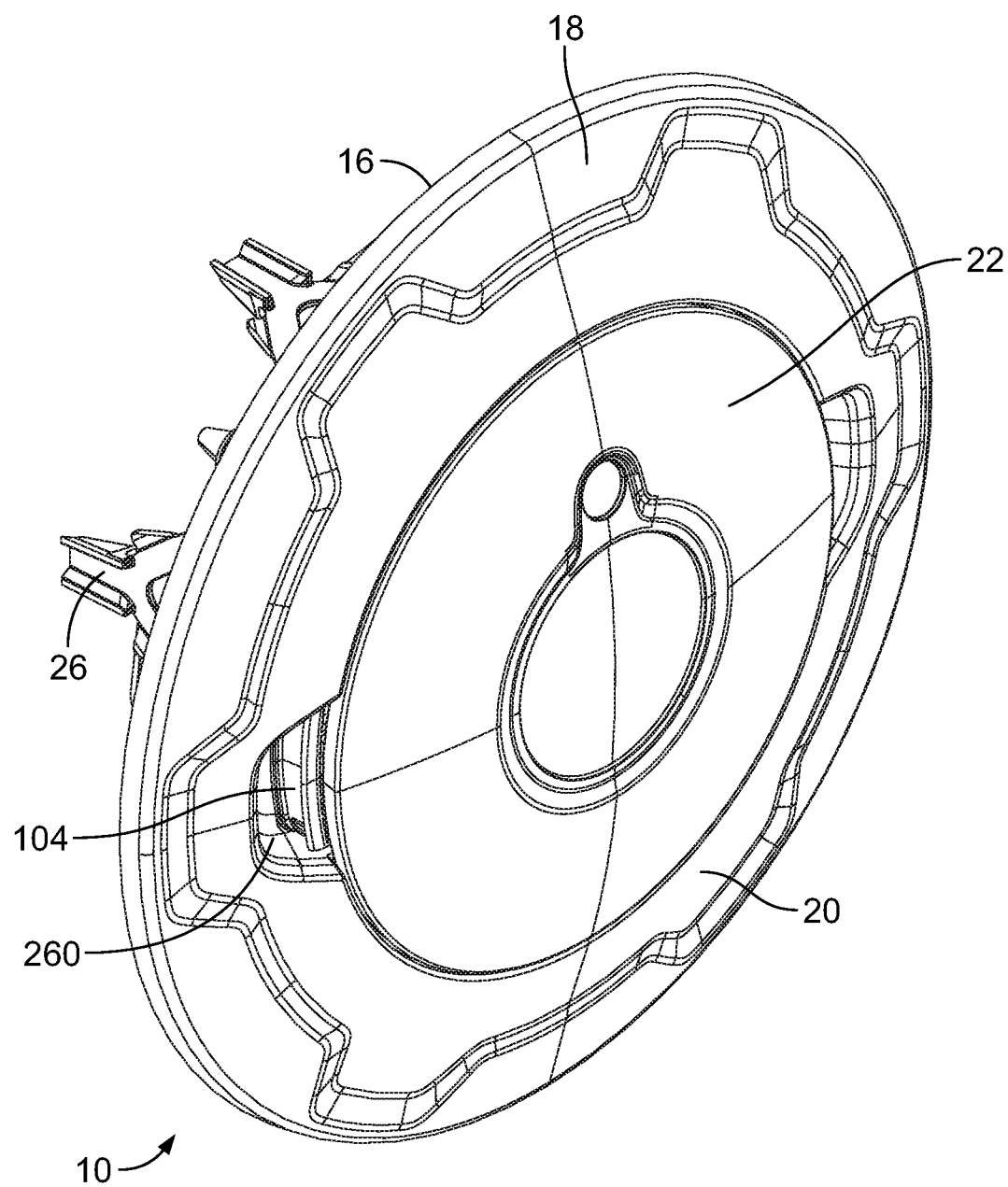
FIG. 1 is a perspective view of a vehicle wheel cover assembly.

In accordance with one aspect of the present disclosure, a vehicle wheel cover assembly is provided that includes a mount. The mount includes an attachment portion having a release configuration that permits the attachment portion to be connected to a vehicle wheel and a secured configuration that secures the mount to the vehicle wheel. The vehicle wheel cover assembly further includes a retainer carried on the mount and movable from an unlocked position that permits the attachment portion to be reconfigured between the release configuration and the secured configuration to a locked position that maintains the attachment portion in the secured configuration. The vehicle wheel cover assembly further includes a cover assembly configured to be releasably connected to the mount. In one embodiment, the attachment portion includes one or more snap fit connectors, such as mounting latches, configured to form a snap-fit connection with a wheel hub flange. In one embodiment, the cover assembly includes an actuator that may be shifted between first and second positions to reconfigure the cover assembly from an unlocked configuration that permits the cover assembly to be connected to the mount and a locked configuration that fixes the cover assembly to the mount.

In another aspect of the present disclosure, a vehicle wheel cover assembly is provided that includes a mount having an attachment portion of the mount with a release configuration that permits the attachment portion to engage inboard and outboard surfaces of a wheel hub flange of a wheel and a secured configuration that fixes the attachment portion to the wheel hub flange. The wheel cover assembly includes a retainer shiftable relative to the attachment portion of the mount from an unlocked position wherein the retainer permits the attachment portion to be reconfigured between the release configuration and the secured configured configuration to a locked position wherein the retainer maintains the attachment portion in the secured configuration. In this manner, a user may position the retainer in the unlocked position, connect the mount to the wheel hub flange, and shift the retainer to the locked position to secure the mount to the wheel hub flange. The mount may be installed on the wheel hub flange by hand and without tools. The wheel cover assembly further includes a cover assembly configured to be releasably secured to the mount and cover an opening of the wheel.

In one embodiment, the attachment portion of the mount includes a plurality of latches and the retainer includes a loop. The retainer loop extends around the latches with the retainer in the locked position. The retainer loop inhibits the latches from separating from the wheel hub flange and keeps the mount secured to the wheel hub flange.

The present disclosure also provides a vehicle wheel cover assembly having an axis of rotation. The vehicle wheel cover assembly includes a mount configured to connect to a wheel hub and a cover assembly. The mount and cover assembly including a locking boss and a receptacle centered on the axis of rotation. The locking boss has an insertion configuration that permits the locking boss to be advanced into the receptacle and a secured configuration that inhibits removal of the locking boss from the receptacle. The cover assembly includes an actuator axially shiftable from an unlocked position wherein the actuator permits the locking boss to be reconfigured between the insertion and secured configurations and a locked configuration wherein the actuator inhibits the locking boss from being reconfigured from the secured configuration to the insertion configuration. The centrally located locking boss and receptacle provides an intuitive approach to connecting the mount and cover assembly that permits a user to quickly and easily connect the cover assembly to the mount.

In another aspect of the present disclosure, a method is provided for attaching a vehicle wheel cover assembly to a wheel hub of a wheel. The method includes connecting an attachment portion of a mount of the vehicle wheel cover assembly to inboard and outboard surfaces of a wheel hub flange. The method further includes shifting a retainer from an unlocked position to a locked position relative to the mount to secure the attachment portion of the mount to the inboard and outboard surfaces of the wheel hub flange. With the retainer in the locked position, the retainer may keep the mount attachment portion engaged with the inboard and outboard surfaces of the wheel hub flange. The method includes connecting a cover assembly of the vehicle wheel cover assembly to the mount secured to the wheel hub flange to cover an opening of the wheel.

Figure 9:
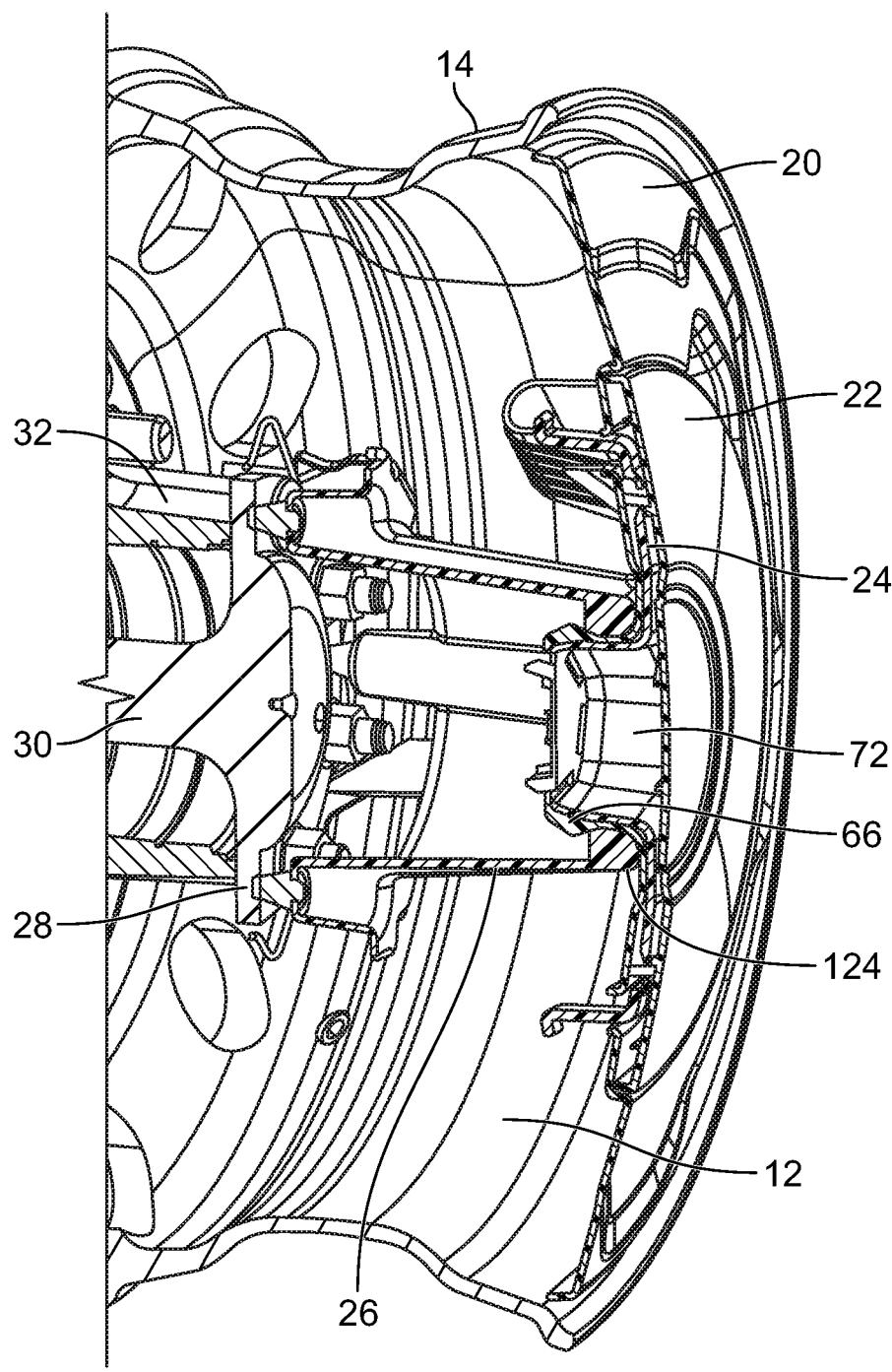
FIG. 9 is a cross-sectional view of the vehicle wheel cover assembly of FIG. 1 mounted to an axle flange and covering a void of the associated wheel rim.

With reference to FIGS. 1 and 9, a vehicle wheel cover assembly 10 is provided for covering a void 12 of a wheel rim 14. The vehicle wheel cover assembly 10 includes an axial inner side 16 facing into the void 12 and an axial outer side 18 facing away therefrom. Regarding FIGS. 1 and 2, the vehicle wheel cover assembly 10 includes a radially outer wheel cover 20, a radially inner wheel cover 22, a latching connector 24, a mount 26, and a retainer 52. The mount 26 is configured to be quickly and easily connected to a wheel hub flange, such as flange 28 of an axle 30 (see FIG. 9), that is secured to a hub 32 of the wheel rim 14, without the use of tools. The mount 26 may likewise be connected to a wheel hub flange of a wheel not driven by an axle, such as a trailer wheel, without the use of tools. The term wheel hub flange as used herein is intended to encompass various types of radially outwardly extending flanges at the center of a wheel. For example, the term wheel hub flange may encompass a flange of an axle secured to a wheel hub (e.g. axle flange 28 in FIG. 10), a flange of a body of a wheel hub (e.g., a wheel hub not driven by an axle), an assembly of an axle flange and a wheel hub body flange, and/or a flange of a trailer-specific hub cap. The assembly of the radially outer wheel cover 20, the radially inner wheel cover 22, and latching connector 24 form a cover assembly 40 (see FIG. 2) that may be quickly and easily connected to the mount 26 without the use of tools. Further, the cover assembly 40 may be readily disconnected from the mount 26 without the use of tools to permit an operator to visually inspect within the void 12 of the wheel rim 14 such as part of a pre-haul checklist. In this manner, the vehicle wheel cover assembly 10 provides improved aerodynamics for a wheel while facilitating a quick, tool-free installation and removal of the cover assembly 40.

Figure 2:
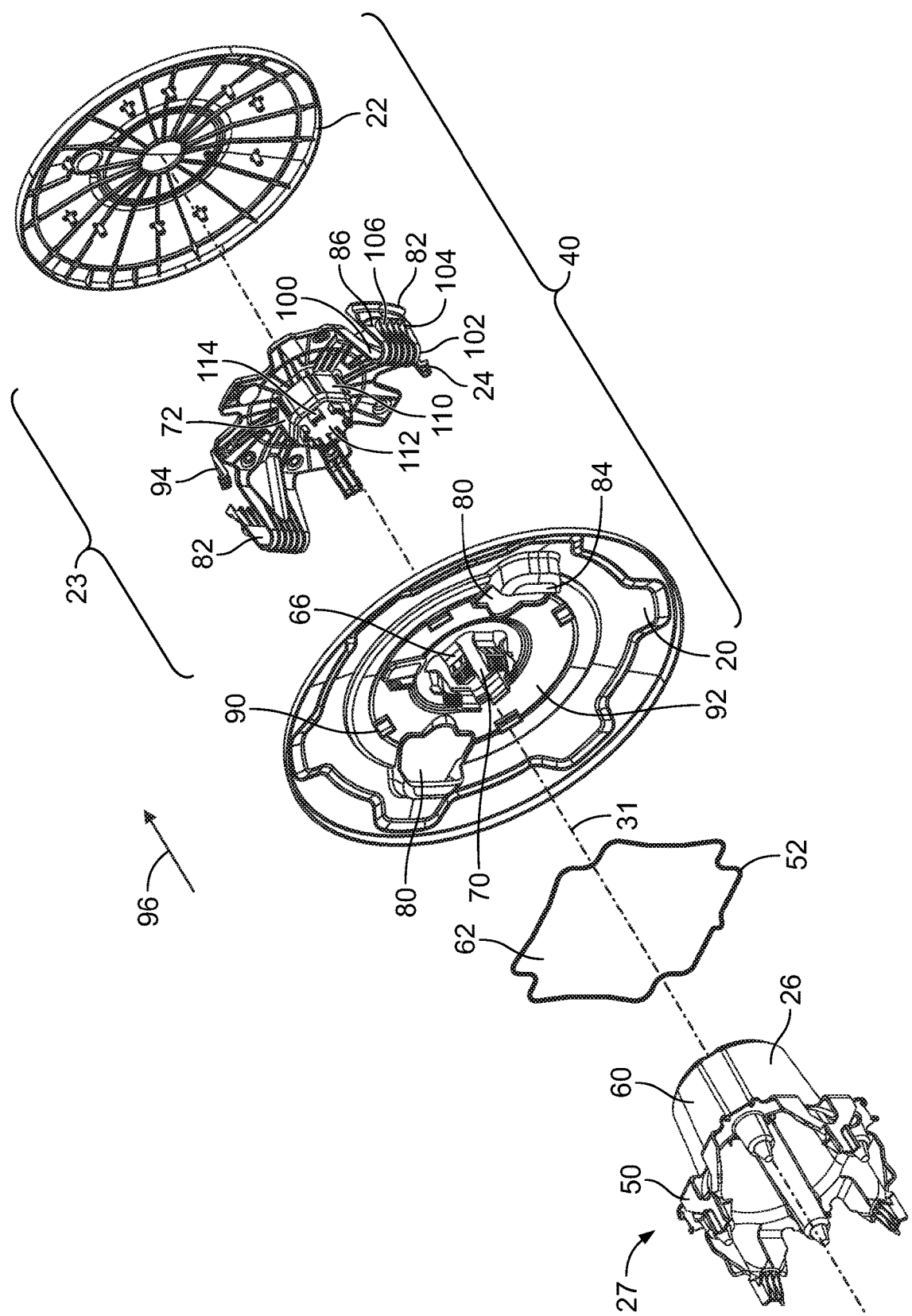
FIG. 2 is an exploded, perspective view of the vehicle wheel cover assembly of FIG. 1 showing a mount, a retainer, a radially outer wheel cover, a latching connector, and a radially inner wheel cover of the vehicle wheel cover assembly.

Regarding FIG. 2, the mount 26 includes an attachment portion 27 having a release configuration that permits the attachment portion 27 to be connected to a vehicle wheel and a secured configuration that secures the mount 26 to the flange 28. In one embodiment, the attachment portion 27 includes one or more mounting latches 50 for engaging the flange 28 of the axle 30 and/or the flange of a wheel hub body. The retainer 52 of the vehicle wheel cover assembly 10 is shiftable in direction 300 from an initial, unlocked position (see FIG. 11) along the mounting latches 50 to a locked position (see FIG. 15). In the locked position, the retainer 52 resists radially outward movement of the mounting latches 50 in radially outward directions 134. This keeps the mounting latches 50 engaged with the flange 28 of the axle 30 and inhibits unintentional release of the mounting latch 50 from the flange 28. In one embodiment, the mount 26 has a body 120 including the latches 50 that is made of a plastic material, such as acrylonitrile butadiene styrene, and the retainer 52 is made of a metallic material, such as stainless spring steel.

Figure 3:
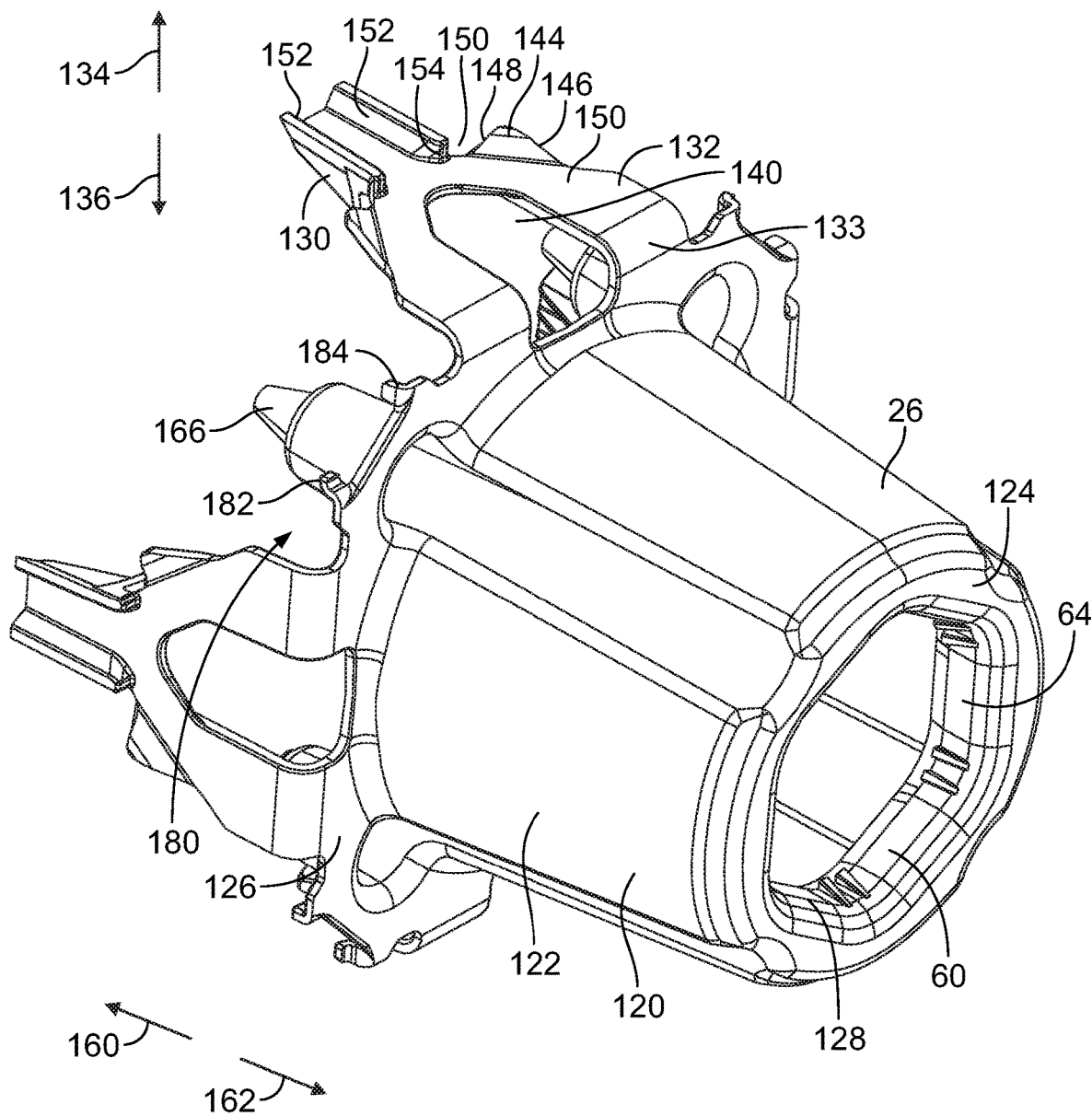
FIG. 3 is a perspective view of the mount of FIG. 2 showing a socket portion for receiving cover latches of the radially outer wheel cover and a locking protrusion of the latching connector.

Regarding FIGS. 2 and 3, the mount 26 includes a socket portion 60 that fits into an opening 62 of the retainer 52. The socket portion 60 includes a receptacle, such as an opening 64, that receives a locking boss, such as one or more cover latches 66, of the radially outer wheel cover 20. The cover latches 66 include projections 68 (see FIG. 17) that extend radially outward and engage an inner lip 124 of the socket portion 60. The engagement of the projections 68 and the lip 124 resists pull-out of the radially outer wheel cover 20 in direction 96 along an axis 31 of rotation of the vehicle wheel cover assembly 10.

Regarding FIG. 2, the radially inner wheel cover 22 and the latching connector 24 together form a radially inner cover assembly 23 and may be connected together using a variety of approaches, such as heat steaking, welding, or fasteners. The radially inner cover assembly 23 operates as an actuator, with shifting of the radially inner cover assembly 23 axially inward causing reconfiguring of the cover assembly 40 to an unlocked configuration and axially outward shifting of the radially inner cover assembly 23 causing reconfiguring of the cover assembly 40 to a locked configuration.

The radially outer wheel cover 20 includes an opening 70 between the cover latches 66 that receives a locking protrusion 72 of the latching connector 24. The locking protrusion 72, the cover latches 66, and the socket portion 60 of the mount 26 have a non-circular, mating fit to resist rotary movement of the radially outer wheel cover 20 and latching connector 24 relative to the mount 26. In one embodiment, the opening 64 of the socket portion 60, the cover latches 66, and the locking protrusion 72 have concentric, hexagonal shapes that, when nested together, resist rotation of the radially outer wheel cover 20 and the latching connector 24 relative to the mount 26.

Figure 17:
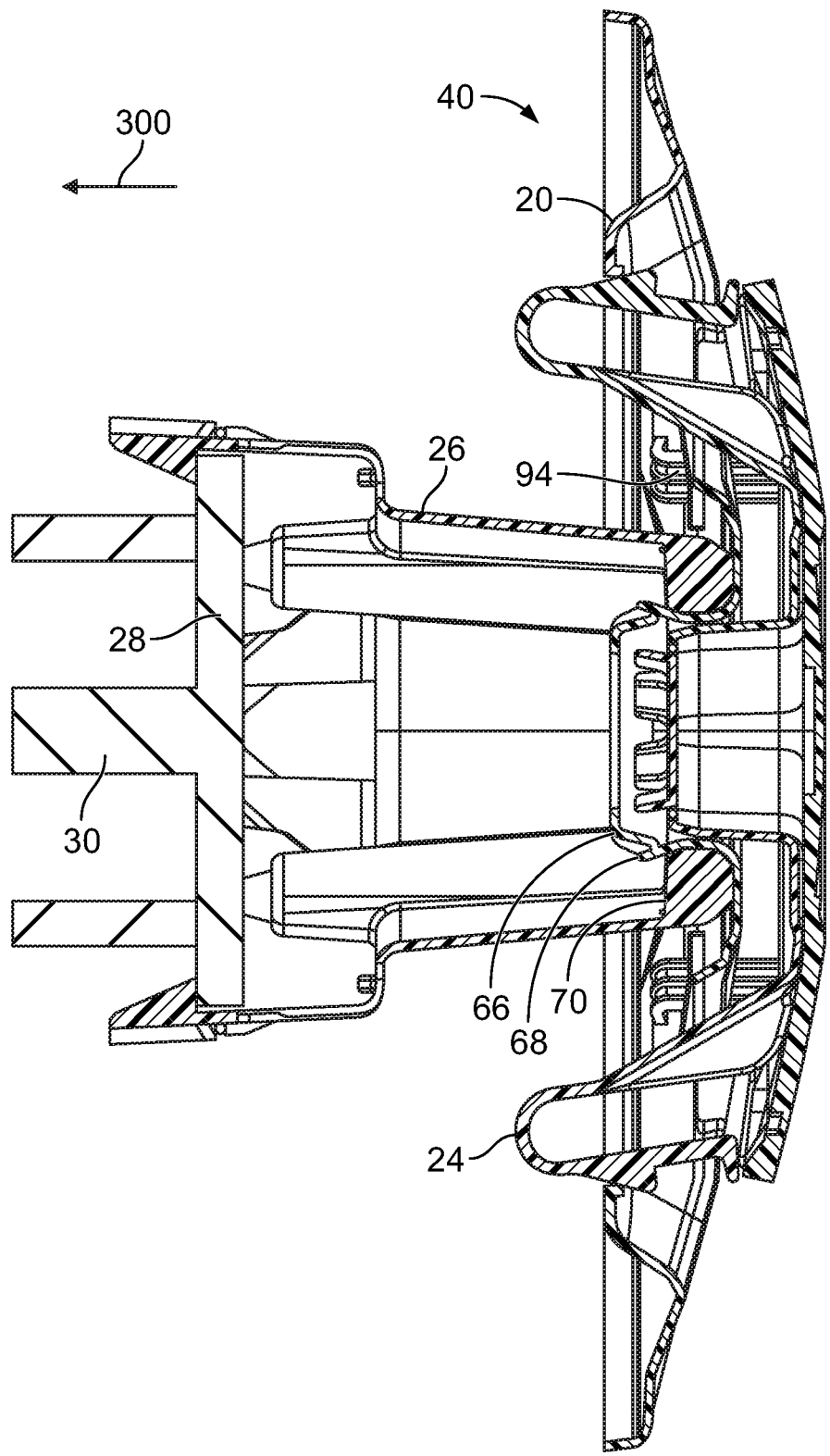
Figure 18:
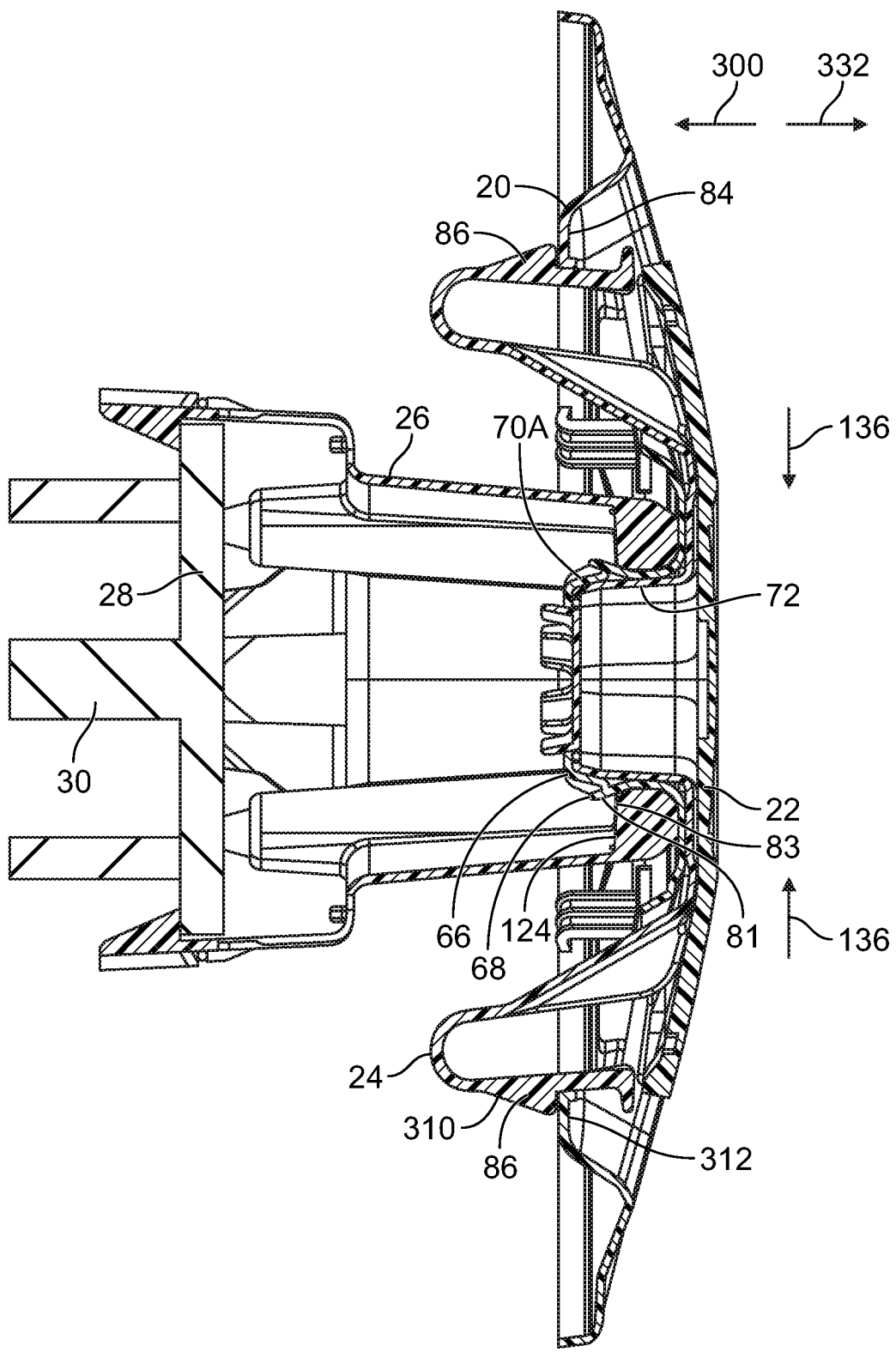

The radially outer wheel cover 20 includes primary latch openings 80 that receive primary latches 82 of the latching connector 24. The radially outer wheel cover 20 includes a catch portion 84 near each of the primary latch openings 80 that are engaged by lips 86 of the primary latches 82. The engagement of the lips 86 with the catch portions 84 maintains the latching connector 24 and the radially outer wheel cover 20 in a locked arrangement wherein the latching connector 24 is seated against the radially outer wheel cover 20 as shown in FIG. 18 and discussed in greater detail below. The radially outer wheel cover 20 further includes latch openings 90 in a wall 92 of the radially outer wheel cover 20 that receive secondary latches 94 of the latching connector 24. The secondary latches 94 limit axial movement of the latching connector 24 in direction 96 away from the radially outer wheel cover 20 a predetermined axial distance when the radially outer wheel cover 20 and latching connector 24 are in an unlocked arrangement and the primary latches 82 are disengaged from the catch portions 84 as shown in FIG. 17. When the radially outer wheel cover 20 and latching connector 24 are in the unlocked arrangement, the cover assembly 40 is in the unlocked configuration thereof and the cover assembly 40 may be pressed onto or pulled off of the mount 26 by hand as desired by a user.

Each primary latch 82 includes a base portion 100, a hinge portion 102, and an arm portion 104. The lip 86 extends radially outward from the arm portion 104. The lip 86 includes a locking face 106 that engages the associated catch portion 84. At the center of the latching connector 24, there is a locking protrusion 72 that includes one or more side walls 110 configured to form a mating fit with the opening 70 of the radially outer wheel cover 20. The locking protrusion 72 includes axially inner wall 112 and tabs 114 extending axially inwardly therefrom. The locking protrusion 72 and the tabs 114 urge the cover latches 66 radially outward and maintain the cover latches 66 in engagement with the lip 124 (see FIG. 18) of the mount 26 when the radially outer wheel cover 20 and latching connector 24 are in the locked arrangement thereof. In this manner, after the user has connected the cover assembly 40 in the unlocked configuration to the mount 26, the user presses the radially inner cover assembly 23 axially inward to shift the cover assembly 40 to the locked configuration thereof. Pressing the radially inner cover assembly 23 axially inward causes the locking protrusion 72 of the latching connector 24 to urge the cover latches 66 apart and fix the radially outer wheel cover 20 to the mount 26. Pressing the radially inner cover assembly 23 axially inward also causes the primary latches 82 of the latching connector 24 to snap past the catch portions 84 and engage axially inner surfaces of the catch portions 84 of the outer wheel cover 20 to fix the latching connector 24 to the radially outer wheel cover 20. The components of the cover assembly 40 may be made of plastic, such as molded plastic, and/or metal, such as stamped metal.

With reference to FIG. 3, the body 120 of the mount 26 includes a tubular wall 122 extending intermediate a rim 124 and a flange portion 126 of the body 120. The rim 124 extends around the opening 64 and includes one or more inner walls 128. In one example, the inner walls 128 form a hexagon to provide a non-rotatable, mating arrangement with the cover latches 66 of the radially outer wheel cover 20 and the locking protrusion 72 of the latching connector 22. The mounting latches 50 extend axially inward from the flange portion 126 for engaging the flange 28 of the axle 30. In one embodiment, the mounting latches 50 each include a lip portion 130, one or more arm portions 132, and one or more hinge portions 133. The hinge portions 133 and/or the arm portions 132 are sufficiently resilient to permit the lip portion 130 to shift radially outward in direction 134 as the mount 26 is being applied to the axle flange 28 and then snap back radially inward in direction 136 once the lip portion has axially cleared the flange 28. In one embodiment, each mounting latch 50 includes a pair of arm portions 132 and hinge portions 133 separated by an opening 140. The opening 140 reduces the material of the body 120 at the mounting latch 50 and increases the flexibility of the arm portions 132 and/or hinge portions 133.

Each mounting latch 50 may form a snap-fit connection with the retainer 52. In one embodiment, each mounting latch 50 includes one or more protrusions 144 that each have a cam surface 146 and a stop surface 148. The cam surface 146 is engaged by the retainer 52 as the retainer 52 is shifted from the unlocked position (see FIG. 12) to the locked position (see FIG. 15). This engagement causes the protrusion 144 to urge the lip portion 130 radially inward in direction 136 as the retainer 52 is shifted in axially inward in direction 300 along the protrusion 144. Once the retainer 52 is positioned at a gap 150 between the protrusion 144 and associated walls 152 of the lip portion 130, the retainer snaps into the gap 150. The snapping of the retainer 52 into the gap 150 provides audible and/or tactile feedback that the retainer 52 is in the locked position. Once the retainer 52 is in the gap 150, each wall 152 has a stop surface 154 that faces on one side of the retainer 52 and the stop surfaces 148 of the protrusion 144 are on the other side of the retainer 52. Stop surfaces 148, 154 cooperate to inhibit the retainer 52 from moving axially in directions 160, 162.

Figure 4:
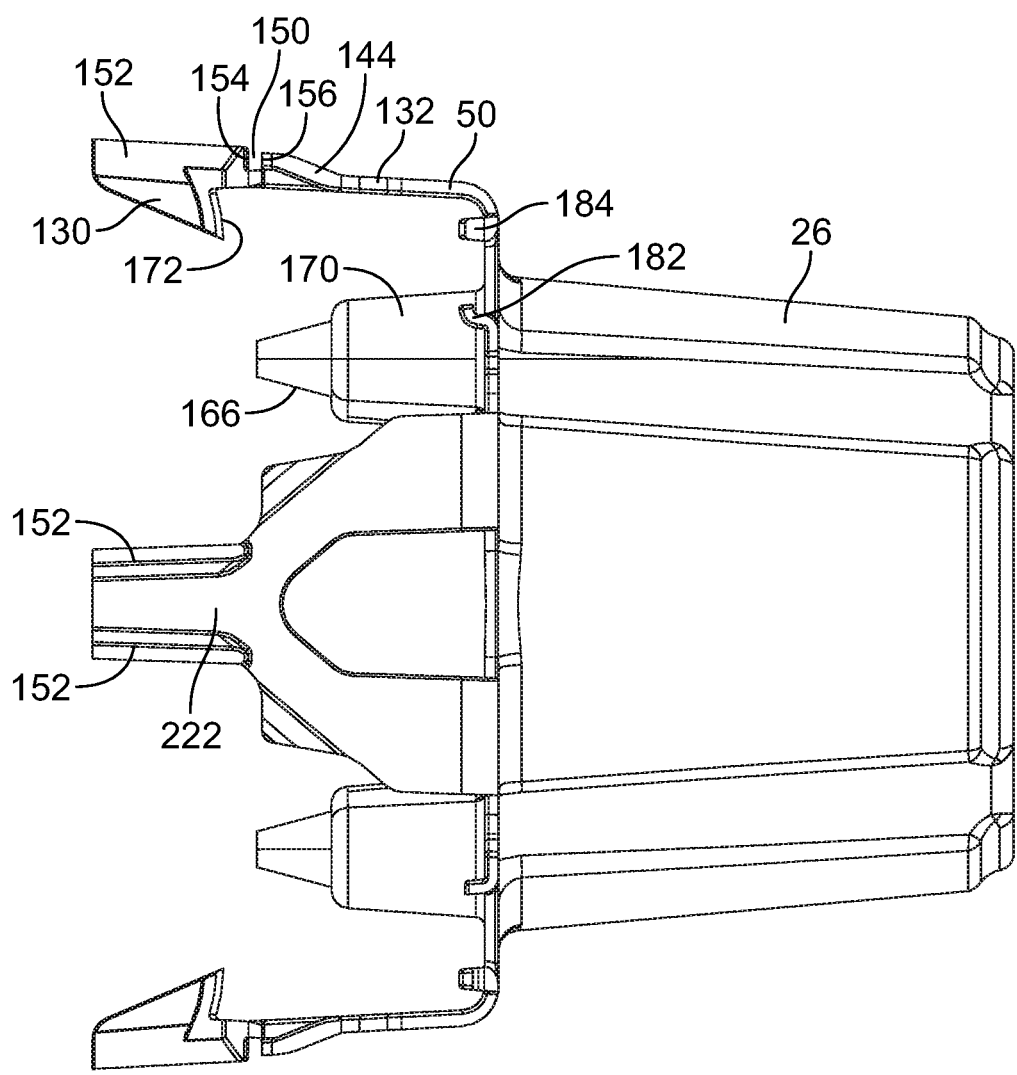
FIG. 4 is a side elevational view of the mount of FIG. 3 showing mounting latches of the mount for engaging an axially inner surface of a flange of an axle or wheel hub and resilient bumpers of the mount for engaging an axially outer surface of the flange.
Figure 15:
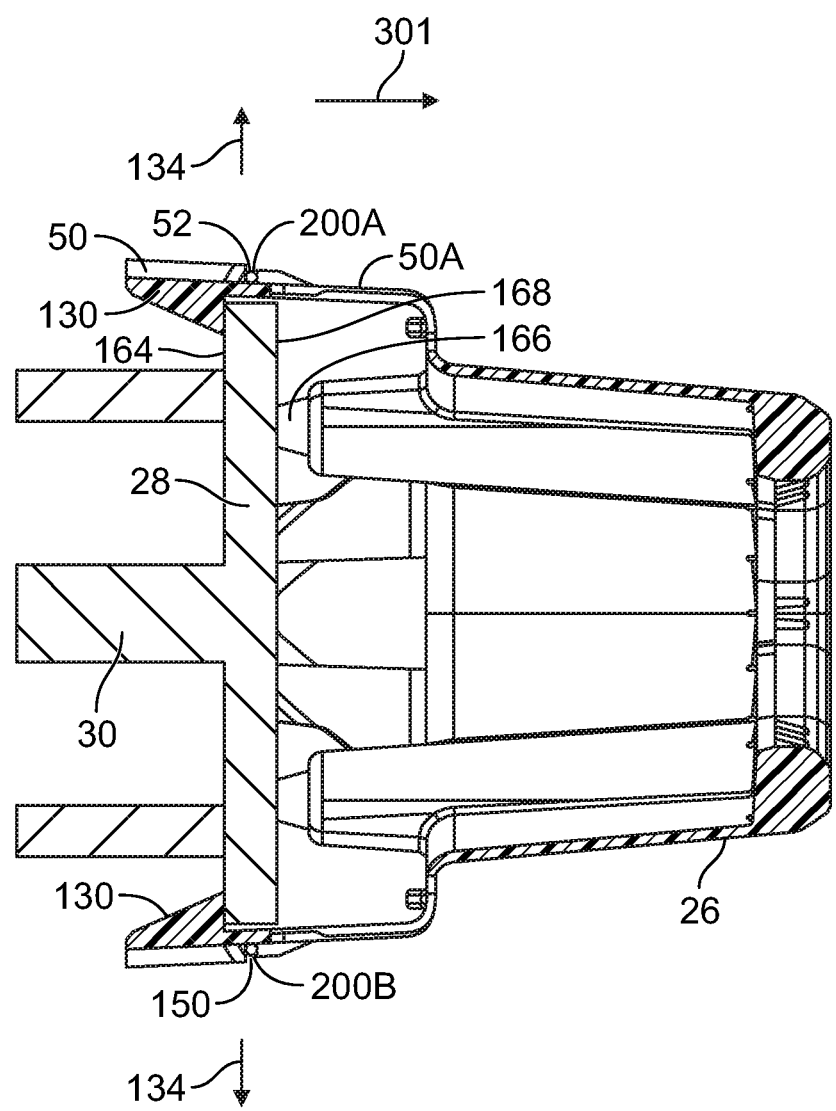

Regarding FIGS. 3, 4, and 15, the lip portions 130 of the mounting latches 50 have latch surfaces 172 that engage an axially inboard surface, such as inner surface 164, of the flange 28. The mount 26 further includes one or more resilient bumpers 166 that engage an axially outboard surface, such as outer surface 168, of the flange 28. In this manner, the flange 28 is held between the lip portion 130 of the mounting latches 50 on the inner surface 164 and the resilient bumpers 166 on the outer surface 168. In one embodiment, the resilient bumpers 166 have a height selected to require compression of the resilient bumpers 166 to fit the flange 28 between the lip portions 130 and the resilient bumpers 166. This compression causes deformation of the resilient bumpers 166 and causes the resilient bumpers 166 to apply a reaction force against the flange 28 that tightly sandwiches the flange 28 between the lip portions 130 of the mounting latches 50 and the resilient bumpers 166. Further, the resilient bumpers 166 may compensate for variation in the axial thickness of flanges 28 of different wheels by compressing different axial distances for different flanges 28.

The resilient material of the resilient bumpers 166 also dampens the vibrations transmitted to the mount 26 by the flange 28 and increases the durability of the mount 26. In one embodiment, the resilient bumpers 166 are made of rubber. Regarding FIGS. 3 and 4, the mount 26 includes one or more supports 170 to which the resilient bumpers 166 are connected. The supports 170 may each be tubular and have a collar that engages a channel of the associated resilient bumper 166 to retain the resilient bumper 166 therein.

Figure 10:
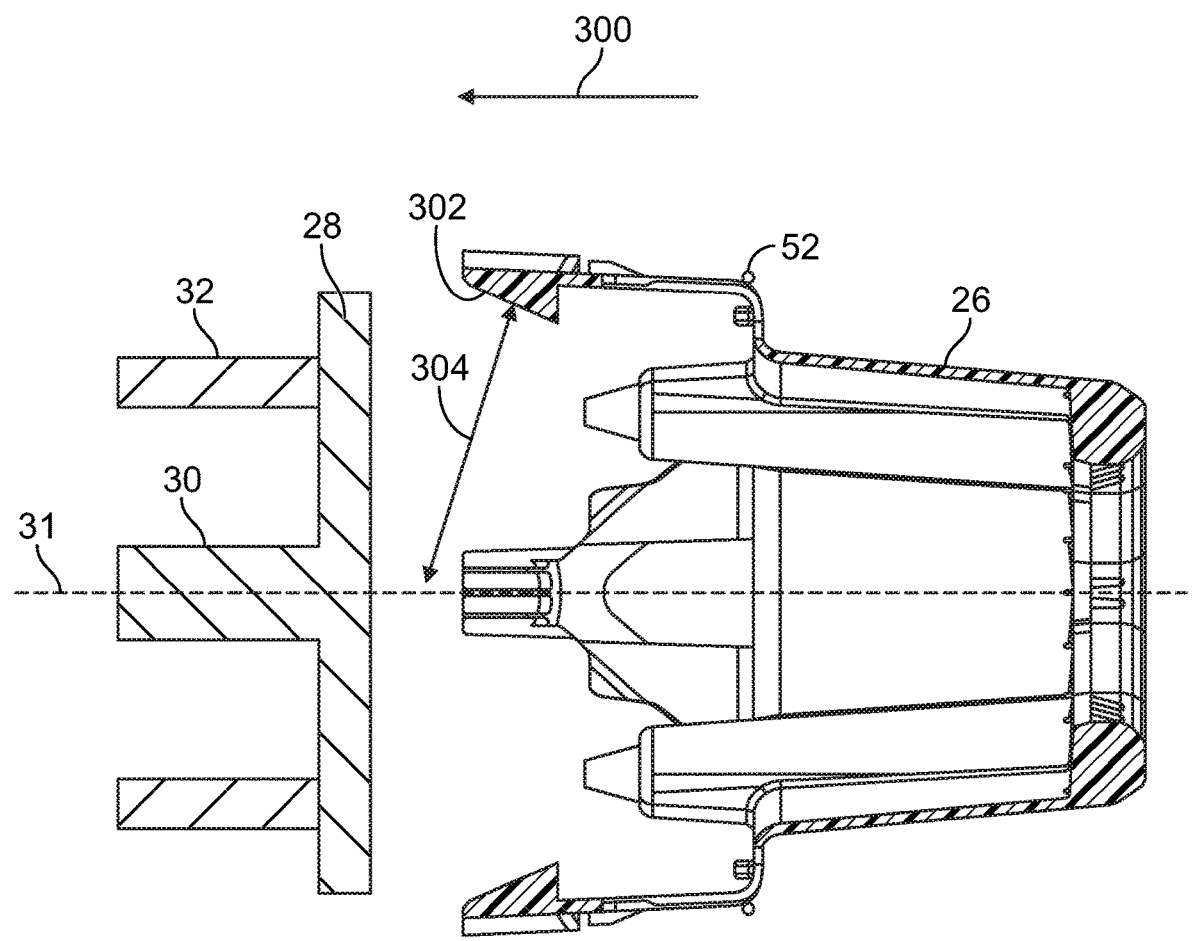
FIGS. 10, 11, 12, 13, 14, 15, 16, 17, and 18 illustrate a method of installing the vehicle wheel cover assembly of FIG. 1 on an axle flange.

Prior to the vehicle wheel cover assembly 10 being connected to a hub flange or axle flange, the retainer 52 is held in the unlocked position as shown in FIG. 10. At the unlocked position, the retainer 52 is axially offset from the lip portions 130 of the mounting latches 50 so as to permit the lip portions 130 to deflect radially outwardly in direction 134 as the lip portion 130 cams over and around the flange 28.

Figure 5:
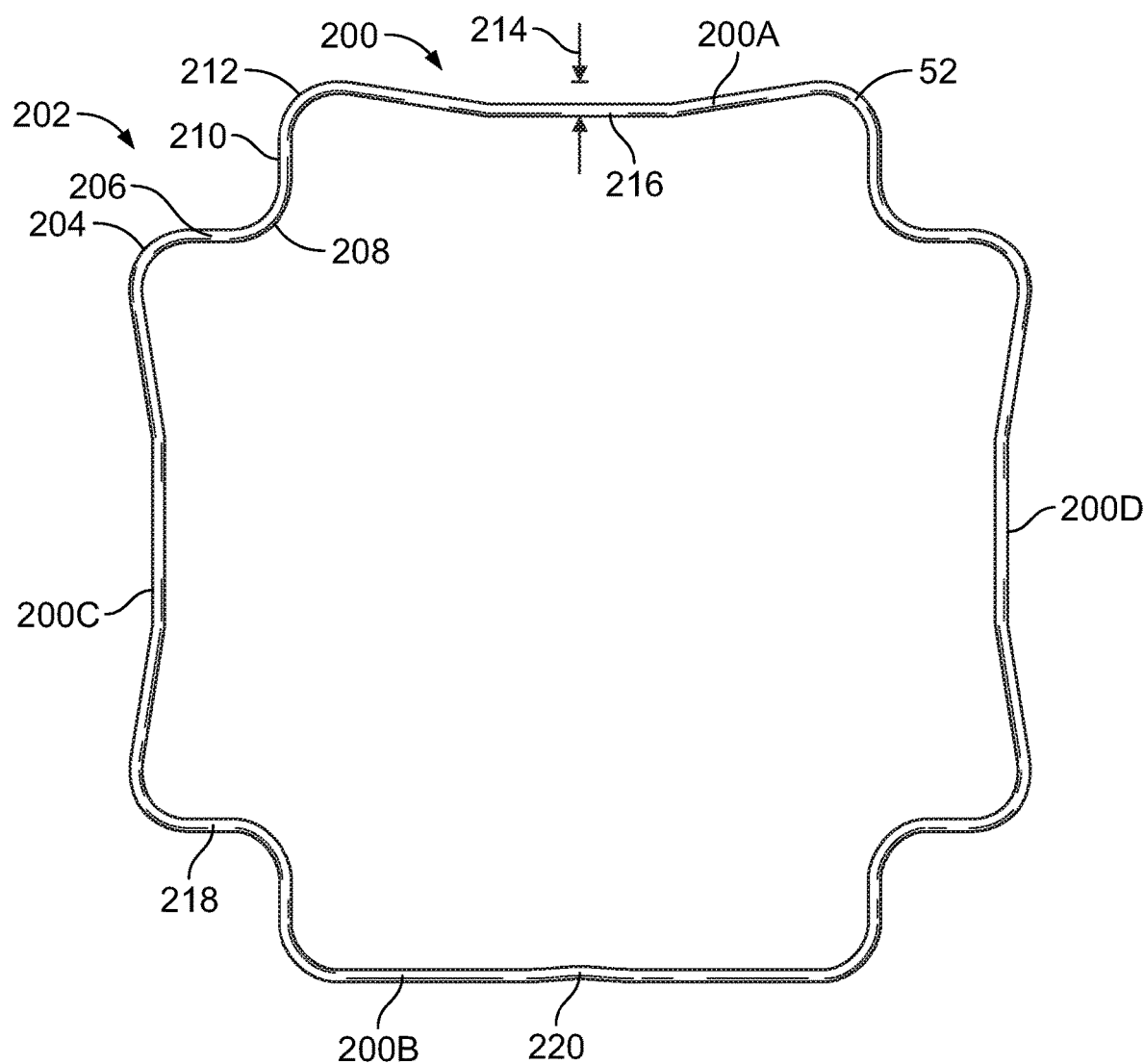
FIG. 5 is a plan view of the retainer of FIG. 2 showing latch engaging portions for engaging the mounting latches of the mount and connecting portions that include curved portions and straight portions joining the latch engaging portions.

With reference to FIG. 5, the retainer 52 includes a loop for extending about the attachment portions 27 of the mount 26, such as latch engaging portions 200 configured to contact the mounting latches 50 and resist radially outward movement of the lip portions 130. The latch engaging portions 200 may include, for example, first, second, third, and fourth latch engaging portions 200A, 200B, 200C, and 200D. The retainer 52 also includes one or more connecting portions 202 connecting the latch engaging portions 200. In one embodiment, each connecting portion 200 includes a first curved portion 204, a first straight portion 206, a second curved portion 208, a second straight portion 210, and a third curved portion 212. The retainer 52 may be formed by separating a length of wire from a supply of the wire (e.g. a coil), shaping the wire using a mandrel, and joining ends of the wire together using a weld.

One or more of the latch engaging portions 200 may have a curved shape with a radially inner portion 216 for contacting the lip portion 130 and offset a distance 214 radially inward from the third curved portion 212 at the end of each latch engaging portion 200. In this manner, the radially inward urging provided by the retainer 52 is focused at the lip portion 130. The retainer 52 may have a continuous body 218 with a uniform cross-section throughout. In other embodiments, the body 218 has a varying cross-section throughout. In one embodiment, the retainer 52 includes a locating portion 220, such as a bend, that fits into a recess 222 (see FIG. 4) between the walls 152 of the latch portion 130 of one of the mounting latches 50. The walls 152 may contact or resist the locating portion 220 moving rotationally. This engagement helps resist rotary movement of the retainer 52 about the mounting latches 50 once the retainer 52 is in the locked position thereof.

Figure 6:
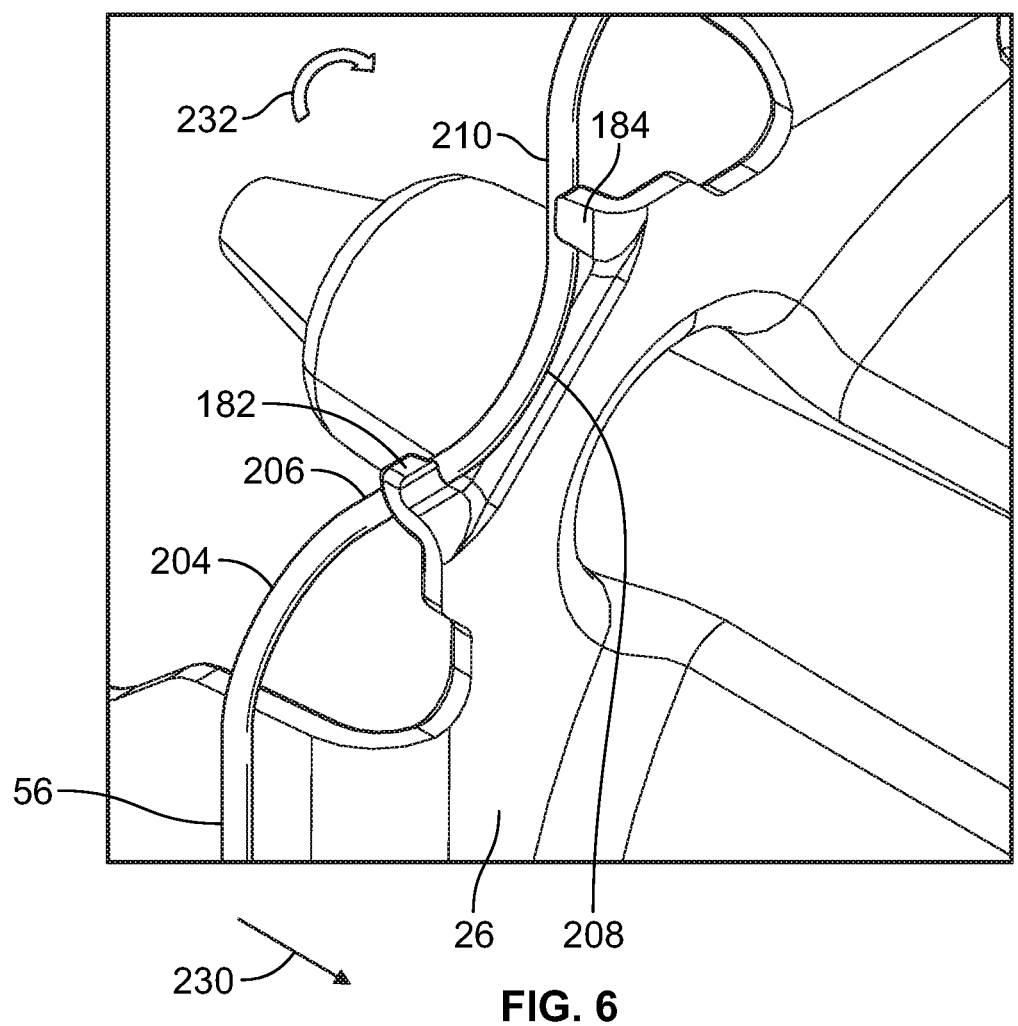
FIG. 6 is a perspective view of a portion of the mount of FIG. 3 and the retainer of FIG. 5 showing the retainer in an initial, unlocked position.

Regarding FIGS. 3 and 6, the mount 26 includes one or more retainer supports 180 to maintain the retainer 52 in the unlocked position. In one embodiment, each retainer support 180 includes an axial stop 182 and a rotary stop 184. The axial stop 182 is in axial overlapping relation with one of the straight portions 206, 210 of each connecting portion 202 of the retainer 52 such that the axial stop 182 resists movement of the retainer 52 in direction 230. Further, the rotary stop 182 is in circumferential overlapping relation with the other of the straight portions 206, 210 to resist turning of the retainer 52 about the mount 26 when the retainer 52 is in the unlocked position thereof. The rotary stop 182 is shown in FIG. 6 to resist turning of the retainer 52 in direction 232. One of the other retainer supports 180 includes a rotary stop 182 configured to resist turning of the retainer 52 about the mount 26 in a direction opposite the direction 232. In this manner, the rotary stops 182 of the mount 26 resist turning of the retainer 52 in either direction about the mount 26 when the retainer 52 is in the unlocked position. This keeps the retainer 52 in correct rotary alignment with the mounting latches 50 until the user shifts the retainer 52 from the unlocked position to the locked position.

Figure 7:
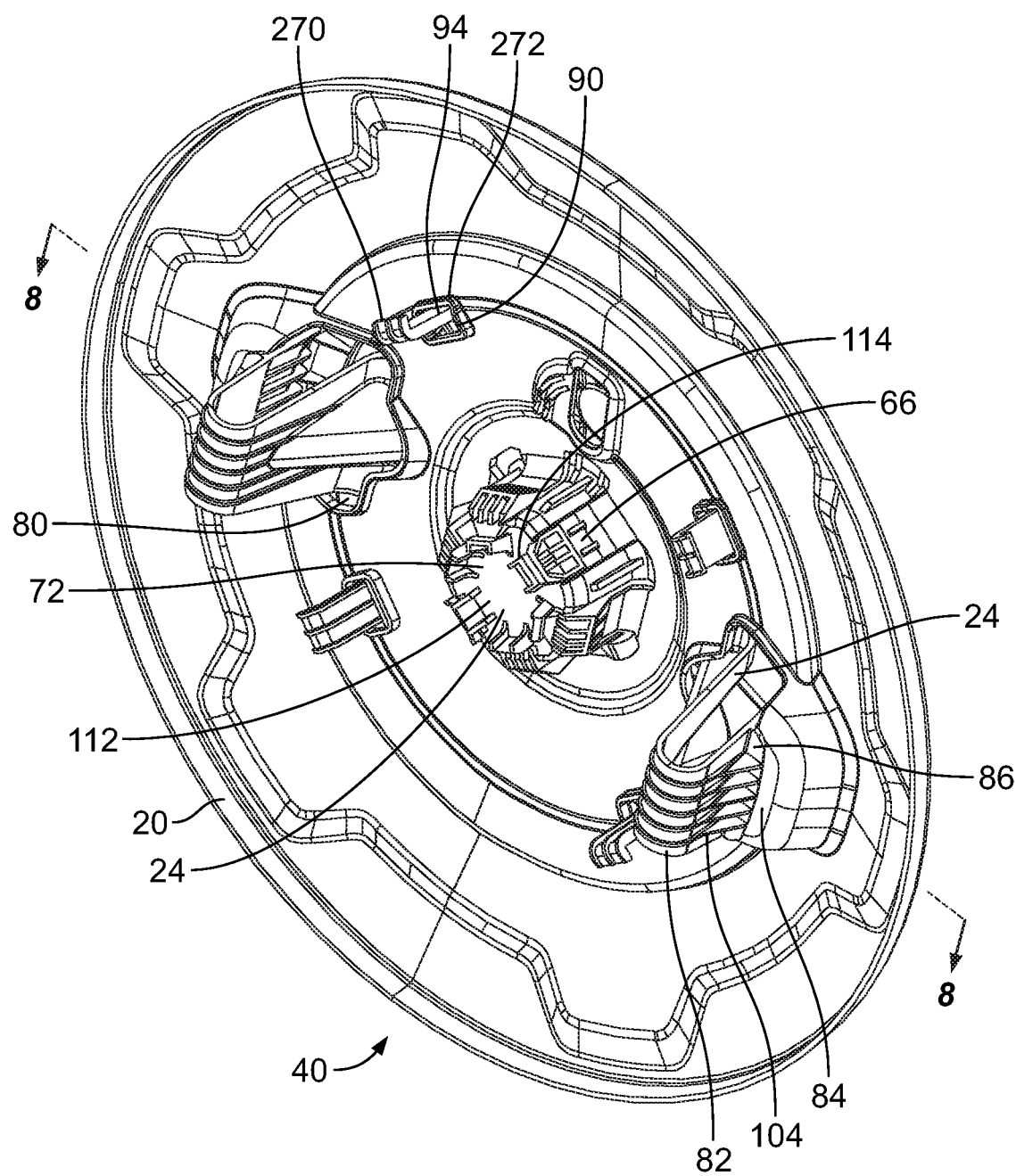
FIG. 7 is a perspective view of a cover assembly that includes the radially outer wheel cover, the latching connector, and the radially inner wheel cover of FIG. 2.
Figure 8:
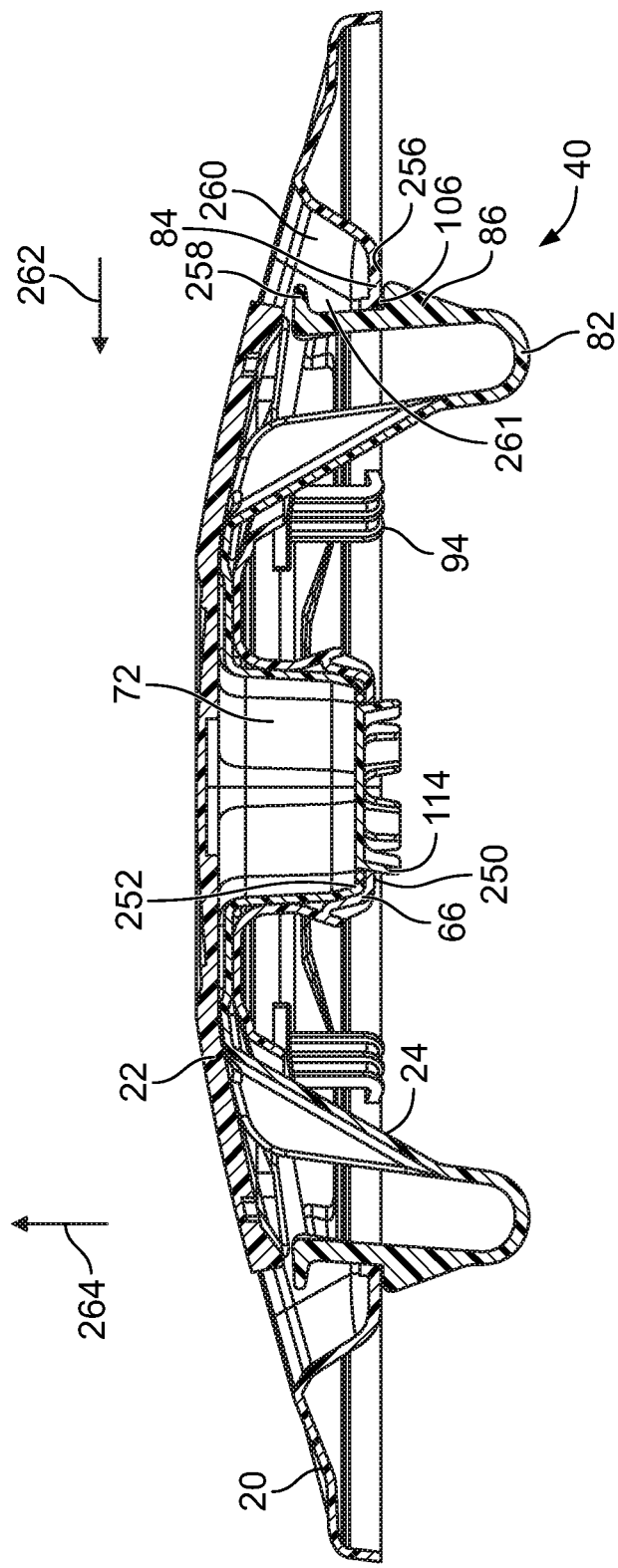
FIG. 8 is a cross-sectional view taken across 8-8 in FIG. 7 showing primary latches of the latching connector engaging axially inner surfaces of catch portions of the radially outer wheel cover.

With reference to FIGS. 7 and 8, the cover assembly 40 is shown in the locked configuration thereof with the locking protrusion 72 of the latching connector 24 fully seated in the opening 70 of the radially outer wheel cover 20. In the locked configuration of the cover assembly 40, the cover latches 66 of the radially outer wheel cover 20 have lips 250 that extend radially inward over a corner 252 of the locking protrusion 72. Further, the lips 86 of the primary latches 82 of the latching connector 24 have locking faces 106 engaged with axially inner surfaces 256 of the catch portions 84. The radially outer wheel cover 20 includes lock disengagement recesses 260 in which tabs 258 of the primary latches 82 are positioned. To reconfigure the cover assembly 40 from the locked configuration (see FIG. 8) to the unlocked configuration (see FIG. 17), a user inserts fingers into a recess 261 between the tab 258 and the catch portion 84 for each primary latch 82 and presses radially inward in direction 262. This shifts the lips 86 of the primary latches 82 into clearance with the catch portions 84 and permits the user to pull the latching connector 24 and radially inner wheel cover 22 connected thereto axially outward in direction 264. Shifting the latching connector 24 axially outward in direction 264 partially withdraws the locking protrusion 72 from the opening 70 so that the cover latches 66 may shift radially inward to permit the cover latches 66 to be withdrawn from the opening 64 of the mount 26.

To limit the axially outward movement of the latching connector 24 in direction 264 away from the radially outer wheel cover 20, the secondary latches 94 of the latching connector 24 have lips 270 (see FIG. 7) that contact a portion, such as a ridge 272, of the radially outer wheel cover 20 near the second latch opening 90. The secondary latches 94 and the ridges 272 thereby keep the radially outer wheel cover 20 and latching connector 24 assembled even after the primary latches 82 have been disengaged from the catch portions 84. This makes the cover assembly 40 easier to handle once the user disconnects the cover assembly 40 from the mount 26.

With reference to FIGS. 10-18, a method is provided for installing the vehicle wheel cover assembly 10 to the flange 28 of the axle 30. A similar method would be utilized to install the wheel cover assembly 10 to a flange of a wheel hub body.

Figure 11:
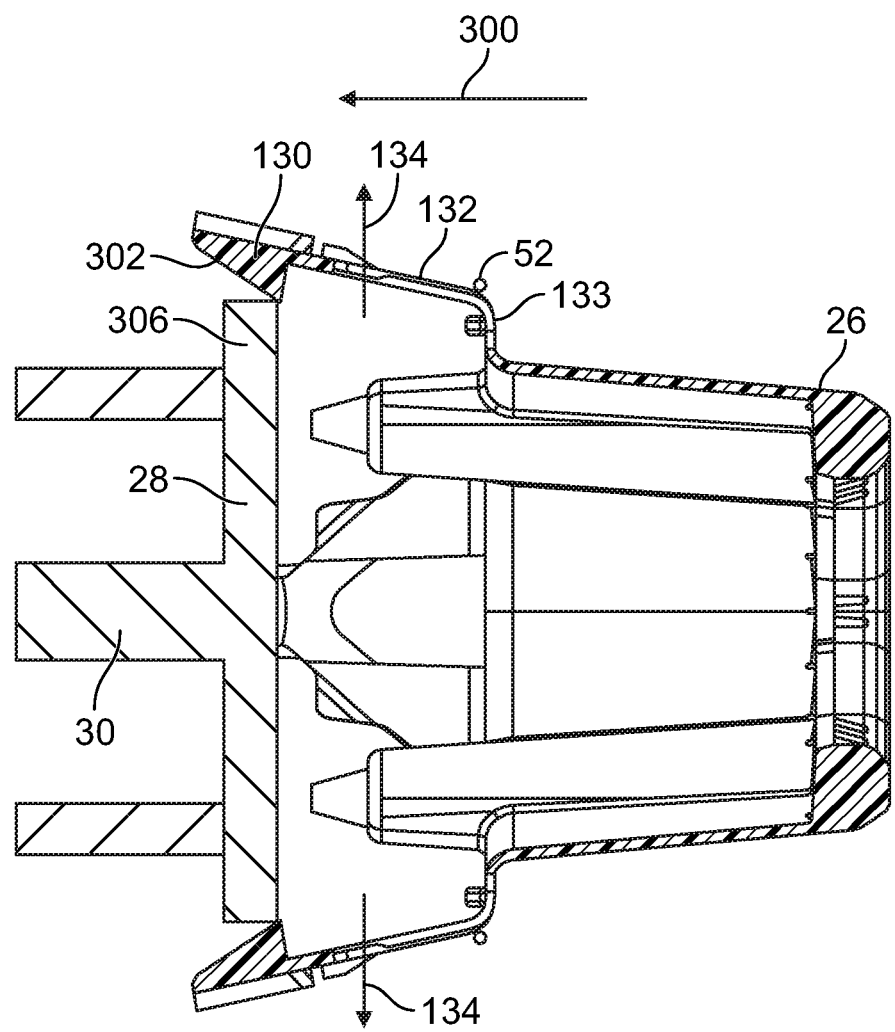

Regarding FIGS. 10 and 11, the mount 26 is initially aligned with the flange 28 and advanced in direction 300 toward the flange 28. The lip portions 130 each include a cam surface 302 that extends transversely, such as at an angle 304, relative to the axis 31. As the mount 26 is advanced in direction 300, the cam surface 302 engages an outer portion 306 of the flange 28. The camming engagement between the cam surface 302 and the flange outer portion 306 urges the lip portion 130 radially outward in direction 134. The hinge portions 133 and/or the arm portions 132 flex to permit the lip portion 130 to shift radially outward in direction 134.

Figure 12:
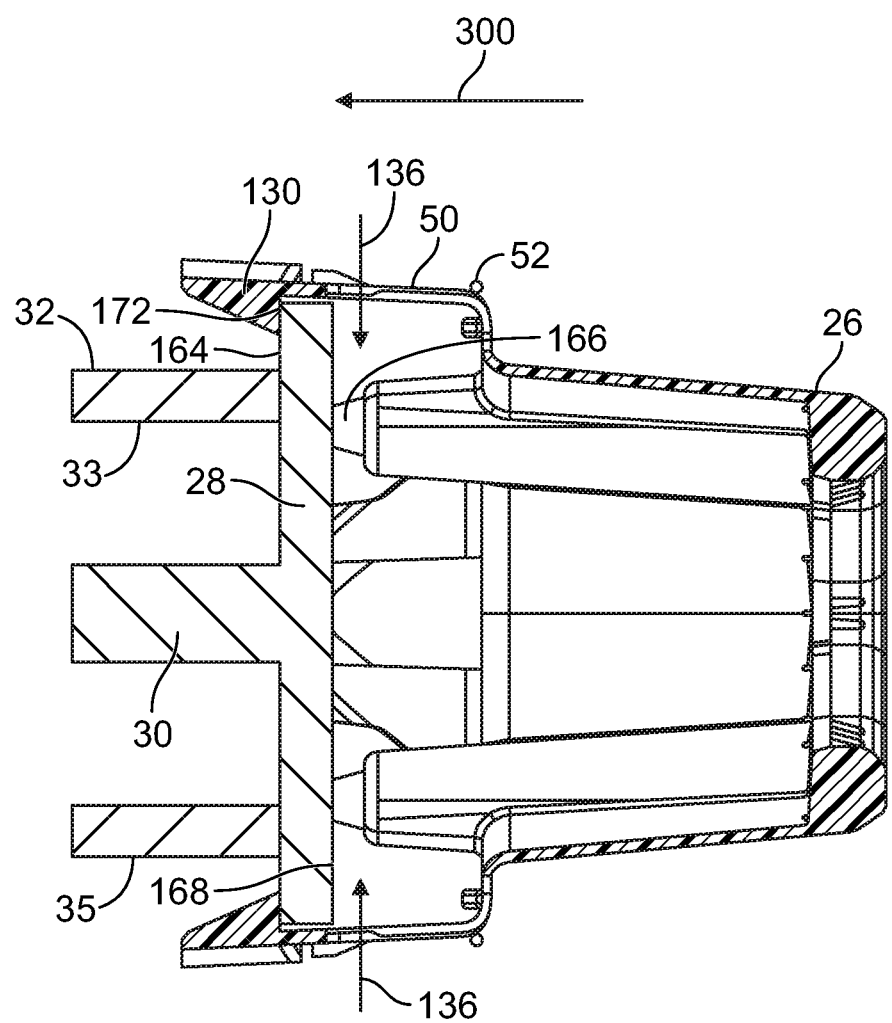

With reference to FIG. 12, continued advancing of the mount 26 in direction 300 causes the lip portions 130 of each mounting latch 50 to shift axially beyond the flange 28. Once the lip portion 130 is clear of the flange 28, the hinge portions 133 and/or the arm portions 132 of the mounting latch 50 urge the lip portion 130 radially inward in direction 136 so that the latch surface 172 is in axial overlapping relation with the inner surface 164 of the flange 28. Further, the advancing of the mount 26 in direction 300 compresses the resilient bumpers 166 against the outer surface 168 of the flange 28. The flange 28 is thereby held between the lip portions 130 of the mounting latches 50 and the resilient bumpers 166. In this manner, the mount 26 may be readily connected to the flange 28 by advancing the mount 26 in direction 300 and permitting the cam surfaces 302 of the lip portions 132 to deflect the lip portions 130 radially outward and around the flange portion 28. The lip portions 130 then resiliently snap radially inward into positions that cause the lip portions 130 to sandwich the flange 28 between the lip portions 130 and the resilient bumpers 166. In FIG. 12, the inner surface 164 of the flange 28 of the axle 30 seats against an annular wall, such as an outboard hub barrel 33, of a body 35 of the wheel hub 32. The body 35 may include an internal cavity that receives, for example, roller bearing assemblies, a spacer, and/or a lock nut for mounting the wheel hub 32 to a vehicle spindle. In some embodiments, the body 35 of the wheel hub 32 has a unitary, one-piece construction that includes an annular wall (e.g., outboard hub barrel 33) or an annular wall and a flange extending radially outward therefrom.

Figure 13:
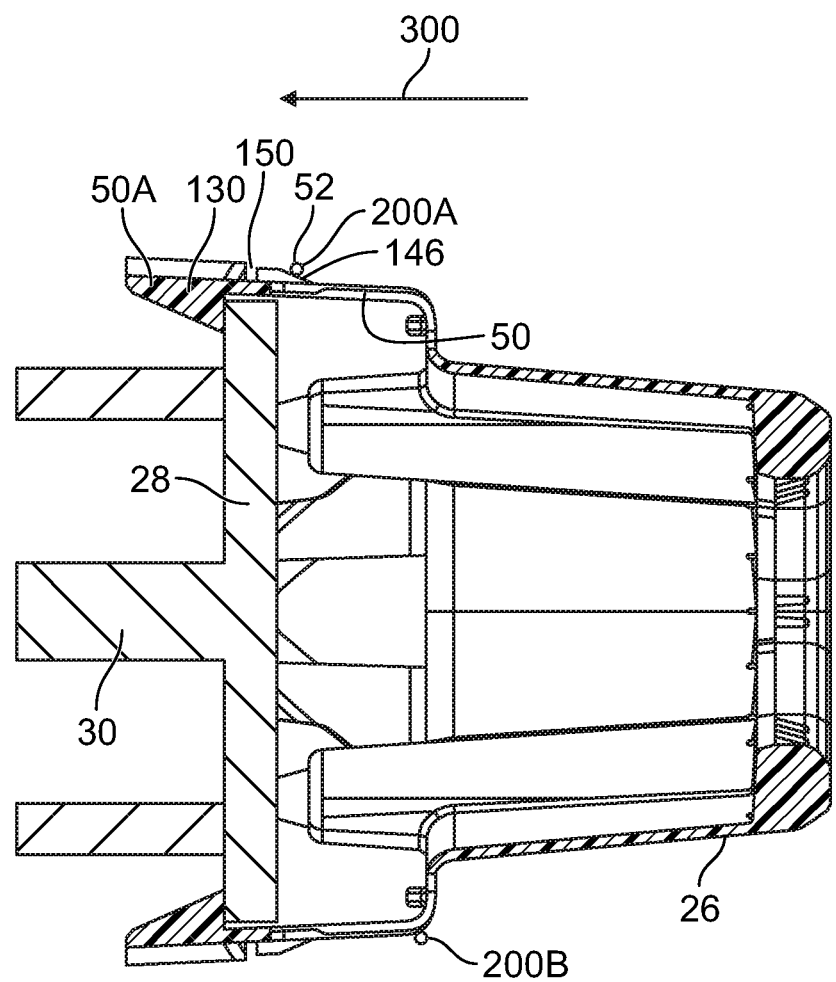

With reference to FIG. 13, once the mount 26 has been connected to the flange 28, the retainer 52 is moved from the unlocked position to the locked position to lock the mount 26 to the flange 28. More specifically, the latch engaging portion 200A is shifted in the direction 300 along a first mounting latch 50A of the mounting latches 50. The latch engaging portion 200A engages the cam surfaces 146 of the protrusions 144 of the mounting latch 50A. Advancing the latch engaging portion 200A along the cam surfaces 146 causes the latch engaging portion 200A to urge the lip portion 130 of the mounting latch 50A slightly radially inward in direction 136.

Figure 14:
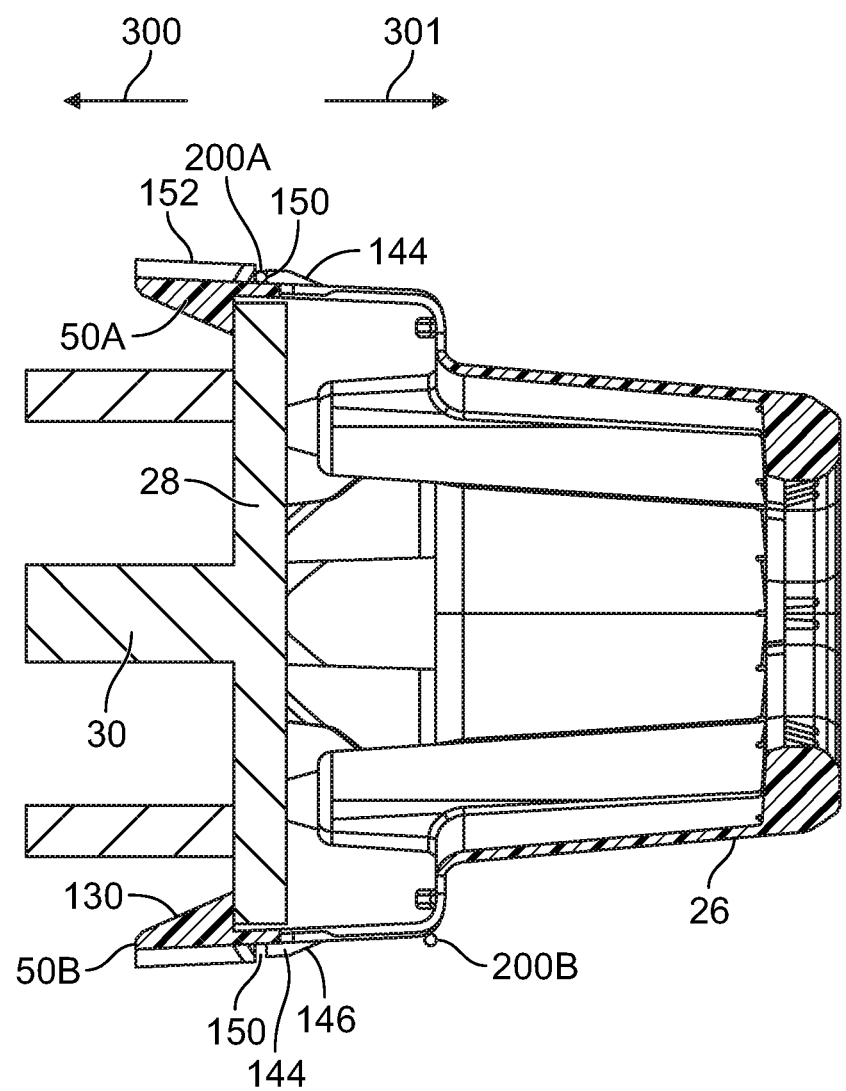

The latch engaging portion 200A of the retainer 52 is continued to be advanced in direction 300 until the latch engaging portion 200A snaps into the gaps 150 of the mounting latch 50 as shown in FIG. 14. The latch engaging portion 200A and the mounting latch 50 thereby form a snap-fit connection between the retainer 52 and the mount 26. The snapping of the latch engaging portion 200A into the gaps 150 may involve the mounting latch 50A rebounding slightly radially outward as the latch engaging portion 200A reaches the gaps 150. With the first latch engaging portion 200A in the gaps 150, the first latch engaging portion 200A is constrained by the walls 152 and the protrusions 144 of the mounting latch 50A. The walls 152 and protrusions 144 resist axial movement in directions 300, 301.

Next, the second latch engaging portion 200B of the retainer 52 is moved from an unlocked position to a locked position in the gaps 150 of the mounting latch 50B. The movement includes pivoting of the retainer 52 generally about a pivot axis defined by the engagement between the first latch engaging portion 200A in the gaps 150 of the mounting latch 50 to swing the second, third, and fourth latch engaging portions 200B, 200C, 200D (see FIG. 5) into the gaps 150 of the respective mounting latches 50. More specifically, the second latch engaging portion 200B is pivoted about the first latch engaging portion 200A to shift the second latch engaging portion 200B generally in direction 300 along the mounting latch 50B. The second latch engaging portion 200B engages the cam surfaces 146 of the protrusions 144 of the mounting latch 50B in a manner similar to the mounting latch 50A, which deflects the lip portion 130 of the mounting latch 50B radially inward. The second latch engaging portion 200B is advanced in direction 300 until the second latch engaging portion 200B snaps into the gaps 150. Further, the pivoting of the second latch engaging portion 200B from the unlocked position to the locked position likewise shifts latch engaging portions 200C, 200D along corresponding mounting latches 50 and into the respective gaps 150 thereof.

With reference to FIG. 15, the retainer 52 is in locked configuration thereof with the latch engaging portions 200 of the retainer 52 received in the gaps 150 of the mounting latches 50. The retainer 52 is in tension and holds the mounting latches 50 in a gripping configuration on the flange 28. The rigidity of the retainer 52 inhibits movement of the lip portions 130 radially outward in directions 134. Because the lip portions 130 are inhibited from shifting radially outward, the lip portions 130 remain in axial overlapping relation with the flange 28 and continue to clamp the flange 28 between the lip portions 130 and the resilient bumpers 166. In one approach, the shifting of the retainer 52 along the mounting latches 50 from the unlocked position to the locked position may be performed by hand. The material of the mounting latches 50 may be selected to permit resilient deformation of the mounting latches 50 to accommodate the more rigid retainer 52 passing along the mounting latches 50.

Figure 16:
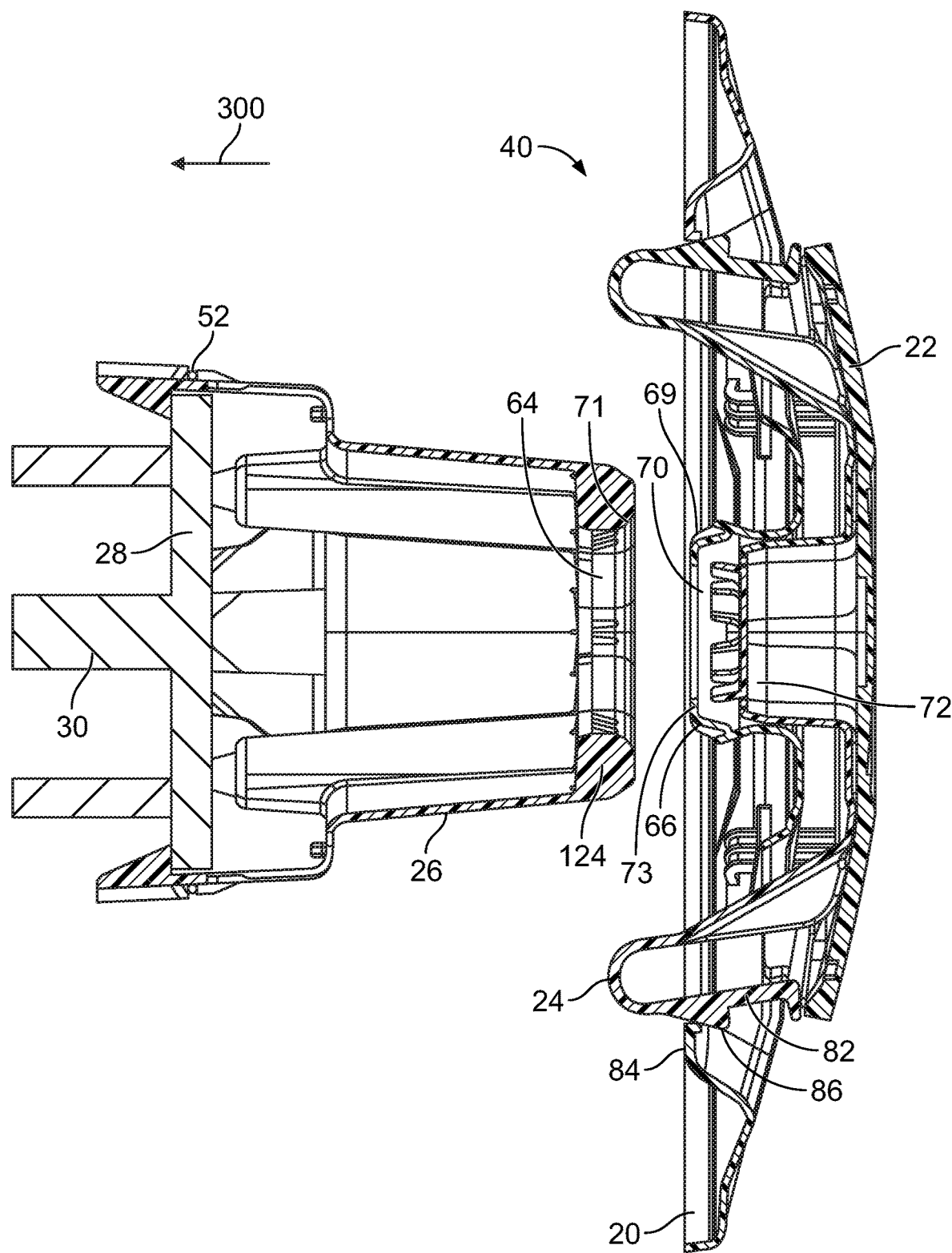

With reference to FIG. 16, the mount 26 has been secured to the flange 28 of the axle 30. The user next aligns the cover latches 66 of the radially outer wheel cover 20 with the opening 64 of the mount 26 and rotationally orients the cover latches 66 and opening 64 so that the hexagonal cross-sections thereof are in register with one another. The cover latches 66 have surfaces 69 configured to cammingly engage with one or more surfaces 71 of the rim 124 and deflect leading end portions 73 of the cover latches 66 radially inward. With the cover latches 66 deflected radially inward, the cover latches 66 may be inserted into and seated within the opening 64. In one embodiment, the surfaces 69 are surfaces extending at an acute angle to the axis 31 and the surface 71 is convexly curved.

The cover assembly 40 is shown in FIG. 16 in the unlocked configuration with the radially outer wheel cover 20 and the radially inner cover assembly 23 in the unlocked configuration thereof. More specifically, the latching connector 24 and the radially inner wheel cover 22 connected thereto are in an axially outward position relative to the radially outer wheel cover 20. In the unlocked configuration of the cover assembly 40, the locking protrusion 72 of the latching connector 24 is partially withdrawn from the opening 70 of the radially outer wheel cover 20. Further, the lips 86 of the primary latches 82 are axially outward from the catch portions 84 of the radially outer wheel cover 20.

Turning to FIG. 17, the user next advances the cover assembly 40 in direction 300 so that the cover latches 66 advance into the opening 64 of the mount 26. Because the locking protrusion 72 is partially withdrawn from the opening 70, the cover latches 66 may deflect radially inward to travel past the lip 124 of the mount 26. Once the cover latches 66 are advanced axially beyond the inner lip 124 of the mount 26, the cover latches 66 may resiliently return radially outward into an interference position wherein the projections 68 are in axial overlapping relation with the inner lip 124 of the mount 26.

Next, the latching connector 24 and the radially inner wheel cover 22 connected thereto are shifted axially inward in direction 300 to reconfigure the cover assembly 40 to the locked configuration thereof as shown in FIG. 18. This shifting of the latching connector 24 in direction 300 causes inclined surfaces 310 of the lip portions 86 of the primary latches 82 to engage axially outer surfaces 312 of the respective catch portions 84. This camming engagement automatically shifts the lip portions 86 radially inward in directions 136 and permits the lip portions 86 to travel axially inward beyond the catch portions 84. Once the lip portions 86 are axially inward of the catch portions 84, the hinge portion 102 and/or arm portion 104 urges the lip portions 84 radially outward and into axial overlapping relation with inner surfaces 256 of the catch portions 84

Further, shifting of the latching connector 24 in direction 300 fully advances the locking projection 72 of the latching connector 24 into the opening 70 between the cover latches 66. The locking projection 72 occludes the opening 70 and resists radially inward movement of the cover latches 66. In this manner, the locking projection 72 fixes the cover latches 66 so that the cover latches 66 have an outer diameter thereacross that is greater than an inner diameter of the lip 124 of the mount 26. In this manner, the cover latches 66 are held in engagement with the lip 124 and resist axially outward movement in direction 332 of the cover assembly 40. Thus, the cover assembly 40 may be readily connected to the mount 26 simply by urging the cover assembly 40 in direction 300 onto the mount 26 which has previously been connected to the flange 28 of the axle 30.

To disconnect the cover assembly 40 from the mount 26, the user presses the arm portions 104 of the primary latches 82 radially inward to disengage the lip portions 86 from the catch portions 84 and moves the radially inner cover assembly 23 in an axially outward direction. With the radially inward cover assembly 23 in the axially outward, unlocked position, the locking protrusion 72 of the latching cover 24 is withdrawn from the opening 70 of the radially outer wheel cover 20 such that the tabs 114 of the locking protrusion 72 no longer block the cover latches 66 from deflecting radially inward. The user pulls the cover assembly 40 axially outward away from the mount 26 and inclined surfaces 81 of the cover latches 66 cammingly engage one or more surfaces 83 of the rim 124 to deflect the cover latches 66 radially inward and permit the latches 66 to be withdrawn from the opening 64 as the cover assembly 40 is pulled axially outward away from the mount 26. The cover latches 66 thereby automatically disconnect from the mount 26 in response to the user moving the cover assembly 40 axially away from the mount 26 once the radially inner cover assembly 23 has been shifted to the axially outward unlocked position. This disconnecting process may be quickly and easily performed by hand without any tools.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass only A, only B, or both A and B.

While there have been illustrated and described particular embodiments of the present invention, it will be appreciated that numerous changes and modifications will occur to those skilled in the art, and it is intended for the present invention to cover all those changes and modifications which fall within the scope of the appended claims.

What is claimed is:

1. A vehicle wheel cover assembly comprising:
   a mount;
   an attachment portion of the mount having a release configuration that permits the attachment portion to engage inboard and outboard surfaces of an annular wheel hub flange of a wheel and a secured configuration that fixes the attachment portion to the wheel hub flange;
   wherein the attachment portion of the mount includes at least one radially inwardly oriented protrusion configured to engage the inboard surface of the wheel hub flange;
   a retainer shiftable relative to the attachment portion of the mount from an unlocked position wherein the retainer permits the attachment portion to be reconfigured between the release configuration and the secured configuration to a locked position wherein the retainer maintains the attachment portion in the secured configuration; and
   a cover assembly configured to be releasably secured to the mount and cover an opening of the wheel.

2. The vehicle wheel cover assembly of claim 1 wherein the attachment portion includes a plurality of latches.

3. The vehicle wheel cover assembly of claim 2 wherein the retainer extends around the latches with the retainer in the locked position and inhibits deflection of the latches away from the wheel hub flange.

4. The vehicle wheel cover assembly of claim 1 wherein the retainer includes a loop extending about the attachment portion of the mount.

5. The vehicle wheel cover assembly of claim 1 wherein the attachment portion of the mount includes a plurality of contact surfaces and a plurality of resilient bumpers configured to engage the inboard and outboard surfaces of the wheel hub flange and sandwich the wheel hub flange between the contact surfaces and the resilient bumpers.

6. The vehicle wheel cover assembly of claim 1 wherein the mount is rotatable with the wheel about an axis and the retainer is shiftable axially along the mount between the unlocked and locked positions.

7. The vehicle wheel cover assembly of claim 1 wherein the mount is rotatable with the wheel about an axis; and
wherein the locked position of the retainer is axially inboard of the unlocked position.

8. The vehicle wheel cover assembly of claim 7 wherein the mount includes at least one stop configured to limit outward axial movement of the retainer beyond the unlocked position.

9. The vehicle wheel cover assembly of claim 7 wherein the mount includes at least one rotary stop configured to resist rotary movement of the retainer about the mount with the retainer in the unlocked position.

10. The vehicle wheel cover assembly of claim 1 wherein the mount and retainer include at least one snap-fit connection therebetween configured to inhibit movement of the retainer from the locked position toward the unlocked position.

11. A vehicle wheel cover assembly comprising:
    a mount;
    an attachment portion of the mount having a release configuration that permits the attachment portion to engage inboard and outboard surfaces of a wheel hub flange of a wheel and a secured configuration that fixes the attachment portion to the wheel hub flange;
    a retainer shiftable relative to the attachment portion of the mount from an unlocked position wherein the retainer permits the attachment portion to be reconfigured between the release configuration and the secured configuration to a locked position wherein the retainer maintains the attachment portion in the secured configuration; and
    a cover assembly configured to be releasably secured to the mount and cover an opening of the wheel;
    wherein the retainer includes a wire and the attachment portion of the mount includes at least one recess that receives the wire with the retainer in the locked position thereof.

12. The vehicle wheel cover assembly of claim 11 wherein the attachment portion includes a plurality of latches; and
    wherein the at least one recess includes at least one recess of each of the latches configured to receive the wire of the retainer.

13. A vehicle wheel cover assembly comprising:
    a mount;
    an attachment portion of the mount having a release configuration that permits the attachment portion to engage inboard and outboard surfaces of a wheel hub flange of a wheel and a secured configuration that fixes the attachment portion to the wheel hub flange;
    a retainer shiftable relative to the attachment portion of the mount from an unlocked position wherein the retainer permits the attachment portion to be reconfigured between the release configuration and the secured configuration to a locked position wherein the retainer maintains the attachment portion in the secured configuration; and
    a cover assembly configured to be releasably secured to the mount and cover an opening of the wheel;
    wherein the mount is rotatable with the wheel about an axis;
    wherein the cover assembly includes at least one latch having a release position that permits the cover assembly to be connected to the mount and a retaining position that inhibits removal of the cover assembly from the mount; and
    wherein the cover assembly includes an actuator axially shiftable from an axially outward, unlocked position wherein the actuator permits the at least one latch of the cover assembly to be reconfigured between the release and retaining positions and an axially inward, locked position wherein the actuator maintains the at least one latch of the cover assembly in the retaining position to secure the cover assembly to the mount.

14. A vehicle wheel cover assembly having an axis of rotation, the vehicle wheel cover assembly comprising:
a mount configured to connect to a wheel hub;
a retainer distinct from the mount and shiftable relative to the mount from an unlocked position wherein the retainer permits the mount to be connected to the wheel hub and a locked position wherein the retainer inhibits disconnecting of the mount from the wheel hub;
a cover assembly for connecting to the mount once the mount has been connected to the wheel hub and the retainer has been shifted to the locked position, the cover assembly distinct from the mount and the retainer;
the mount and cover assembly including a locking boss and a receptacle centered on the axis of rotation, the locking boss having an insertion configuration that permits the locking boss to be advanced into the receptacle and a secured configuration that inhibits removal of the locking boss from the receptacle; and
an actuator of the cover assembly axially shiftable from an unlocked position wherein the actuator permits the locking boss to be reconfigured between the insertion and secured configurations and a locked configuration wherein the actuator inhibits the locking boss from being reconfigured from the secured configuration to the insertion configuration.

15. The vehicle wheel cover assembly of claim 14 wherein the locking boss includes a plurality of latches.

16. The vehicle wheel cover assembly of claim 15 wherein the receptacle includes a central opening that receives the latches and a rim extending about the central opening; and
wherein the latches include barbs configured to engage an underside of the rim.

17. A vehicle wheel cover assembly having an axis of rotation, the vehicle wheel cover assembly comprising:
a mount configured to connect to a wheel hub;
a cover assembly;
the mount and cover assembly including a locking boss and a receptacle centered on the axis of rotation, the locking boss having an insertion configuration that permits the locking boss to be advanced into the receptacle and a secured configuration that inhibits removal of the locking boss from the receptacle;
an actuator of the cover assembly axially shiftable from an unlocked position wherein the actuator permits the locking boss to be reconfigured between the insertion and secured configurations and a locked configuration wherein the actuator inhibits the locking boss from being reconfigured from the secured configuration to the insertion configuration; and
wherein the locking boss includes a plurality of walls configured to form a mating fit with surfaces of the receptacle and resist turning of the cover assembly relative to the mount.

18. A vehicle wheel cover assembly having an axis of rotation, the vehicle wheel cover assembly comprising:
a mount configured to connect to a wheel hub;
a cover assembly;
the mount and cover assembly including a locking boss and a receptacle centered on the axis of rotation, the locking boss having an insertion configuration that permits the locking boss to be advanced into the receptacle and a secured configuration that inhibits removal of the locking boss from the receptacle; and
an actuator of the cover assembly axially shiftable from an unlocked position wherein the actuator permits the locking boss to be reconfigured between the insertion and secured configurations and a locked configuration wherein the actuator inhibits the locking boss from being reconfigured from the secured configuration to the insertion configuration;
wherein the locking boss includes a locking boss opening and a plurality of locking boss members disposed about the locking boss opening; and
wherein the actuator includes a locking protrusion configured to be seated in the locking boss opening with the actuator in the locked position to inhibit movement of the locking members and at least partially withdrawn from the locking boss opening with the actuator in the unlocked position to permit movement of the locking members.

19. A vehicle wheel cover assembly having an axis of rotation, the vehicle wheel cover assembly comprising:
a mount configured to connect to a wheel hub;
a cover assembly;
the mount and cover assembly including a locking boss and a receptacle centered on the axis of rotation, the locking boss having an insertion configuration that permits the locking boss to be advanced into the receptacle and a secured configuration that inhibits removal of the locking boss from the receptacle; and
an actuator of the cover assembly axially shiftable from an unlocked position wherein the actuator permits the locking boss to be reconfigured between the insertion and secured configurations and a locked configuration wherein the actuator inhibits the locking boss from being reconfigured from the secured configuration to the insertion configuration;
wherein the mount includes the receptacle and the cover assembly includes the locking boss.

20. The vehicle wheel cover assembly of claim 14 wherein the locking boss includes a plurality of latches; and
wherein the latches are deflectable toward one another with the locking boss in the insertion configuration to permit the locking boss to be advanced into the receptacle.

21. A method of attaching a vehicle wheel cover assembly to a wheel hub flange of a wheel, the method comprising:
connecting an attachment portion of a mount of the vehicle wheel cover assembly to inboard and outboard surfaces of the wheel hub flange;
while a cover assembly of the vehicle wheel cover assembly is disconnected from the mount, shifting a retainer from an unlocked position to a locked position relative to the mount to secure the attachment portion of the mount to the inboard and outboard surfaces of the wheel hub flange; and
connecting the cover assembly of the vehicle wheel cover assembly to the mount secured to the wheel hub flange to cover an opening of the wheel.

22. The method of claim 21 wherein shifting the retainer from the unlocked position to the locked position includes shifting the retainer along an axis of rotation of the vehicle wheel cover assembly.

23. A method of attaching a vehicle wheel cover assembly to a wheel hub flange of a wheel, the method comprising:

connecting an attachment portion of a mount of the vehicle wheel cover assembly to inboard and outboard surfaces of the wheel hub flange;

shifting a retainer from an unlocked position to a locked position relative to the mount to secure the attachment portion of the mount to the inboard and outboard surfaces of the wheel hub flange;

connecting a cover assembly of the vehicle wheel cover assembly to the mount secured to the wheel hub flange to cover an opening of the wheel;

wherein shifting the retainer from the unlocked position to the locked position includes:

pivoting a first portion of the retainer from a first unlocked position to a first locked position relative to the mount; and pivoting a second portion of the retainer from a second unlocked position to a second locked position relative to the mount while the first portion of the retainer is at the first locked position.

24. The method of claim 21 wherein connecting the attachment portion of the mount to the wheel hub flange includes engaging a plurality of latches of the mount with the wheel hub flange; and wherein shifting the retainer from the unlocked position to the locked position includes shifting the retainer along at least one of the latches.

25. The method of claim 24 wherein the retainer includes a loop; and wherein shifting the retainer from the unlocked position to the locked position includes shifting the loop along the latches of the mount.

26. The method of claim 21 wherein the attachment portion of the mount includes at least one latch; and wherein shifting the retainer from the unlocked position to the locked position includes cammingly engaging a portion of the retainer with an inclined surface of the at least one latch.

27. The method of claim 21 wherein shifting the retainer from the unlocked position to the locked position includes snapping the retainer into recesses of the attachment portion of the mount.

28. A method of attaching a vehicle wheel cover assembly to a wheel hub flange of a wheel, the method comprising:

connecting an attachment portion of a mount of the vehicle wheel cover assembly to inboard and outboard surfaces of the wheel hub flange;

shifting a retainer from an unlocked position to a locked position relative to the mount to secure the attachment portion of the mount to the inboard and outboard surfaces of the wheel hub flange;

connecting a cover assembly of the vehicle wheel cover assembly to the mount secured to the wheel hub flange to cover an opening of the wheel;

wherein the mount and the cover assembly include an opening and a plurality of cover latches;

wherein connecting the cover assembly to the mount includes advancing the cover latches into the opening; and shifting an actuator of the cover assembly toward the wheel hub and along an axis of rotation of the vehicle wheel cover assembly from an unlocked position wherein the actuator permits the cover latches to be advanced into the opening to a locked position wherein the actuator inhibits the cover latches from being removed from the opening.

29. The vehicle wheel cover assembly of claim 14 wherein the cover assembly comprises a radially outer wheel cover, a latching connector, and a radially inner wheel cover; and wherein the actuator includes the latching connector and the radially inner wheel cover.

30. The vehicle wheel cover assembly of claim 19 wherein the locking boss includes a plurality of latches.

31. The vehicle wheel cover assembly of claim 30 wherein the receptacle includes a central opening that receives the latches and a rim extending about the central opening; and wherein the latches include barbs configured to engage an underside of the rim.

32. The vehicle wheel cover assembly of claim 19 wherein the locking boss includes a plurality of walls configured to form a mating fit with surfaces of the receptacle and resist turning of the cover assembly relative to the mount.

33. The vehicle wheel cover assembly of claim 19 wherein the locking boss includes a locking boss opening and a plurality of locking boss members disposed about the locking boss opening; and wherein the actuator includes a locking protrusion configured to be seated in the locking boss opening with the actuator in the locked position to inhibit movement of the locking members and at least partially withdrawn from the locking boss opening with the actuator in the unlocked position to permit movement of the locking members.

34. The vehicle wheel cover assembly of claim 19 wherein the locking boss includes a plurality of latches; and wherein the latches are deflectable toward one another with the locking boss in the insertion configuration to permit the locking boss to be advanced into the receptacle.

* * * * *